United States Patent
Van Dijk et al.

(10) Patent No.: US 10,434,456 B2
(45) Date of Patent: Oct. 8, 2019

(54) PROCESS FOR REMOVING AND RECOVERING H₂S FROM A GAS STREAM BY CYCLIC ADSORPTION

(71) Applicant: Stichting Energieonderzoek Centrum Nederland, Petten (NL)

(72) Inventors: Hendricus Adrianus Johannes Van Dijk, Petten (NL); Paul Dean Cobden, Petten (NL); Stéphane Walspurger, Petten (NL)

(73) Assignee: STICHTING ENERGIEONDERZOEK CENTRUM NEDERLAND, Petten (NL)

( * ) Notice: Subject to any disclaimer, the term of this patent is extended or adjusted under 35 U.S.C. 154(b) by 198 days.

(21) Appl. No.: 15/525,498

(22) PCT Filed: Nov. 10, 2015

(86) PCT No.: PCT/EP2015/076151
§ 371 (c)(1),
(2) Date: May 9, 2017

(87) PCT Pub. No.: WO2016/075109
PCT Pub. Date: May 19, 2016

(65) Prior Publication Data
US 2017/0333826 A1   Nov. 23, 2017

(30) Foreign Application Priority Data
Nov. 10, 2014   (NL) ..................... 2013759

(51) Int. Cl.
*B01D 53/02* (2006.01)
*B01J 20/08* (2006.01)
(Continued)

(52) U.S. Cl.
CPC ........... *B01D 53/02* (2013.01); *B01D 53/526* (2013.01); *B01D 53/62* (2013.01);
(Continued)

(58) Field of Classification Search
CPC .......... B01D 2251/30; B01D 2253/104; B01D 2253/25; B01D 2255/202;
(Continued)

(56) References Cited

U.S. PATENT DOCUMENTS

| 5,591,418 A * | 1/1997 | Bhattacharyya ......... B01J 20/06 |
| | | 423/239.1 |
| 2006/0140852 A1 | 6/2006 | Russell et al. |
| 2011/0068047 A1 * | 3/2011 | Gudde ..................... C01B 3/12 |
| | | 208/216 R |

FOREIGN PATENT DOCUMENTS

| DE | 10 2006 045 379 A1 | 4/2008 |
| EP | 1 142 623 A2 | 10/2001 |

(Continued)

OTHER PUBLICATIONS

International Search Report issued in International Patent Application No. PCT/EP2015/076151, dated Apr. 18, 2016.

*Primary Examiner* — Christopher P Jones
(74) *Attorney, Agent, or Firm* — Gilberto M. Villacorta; Sunit Talapatra; Foley & Lardner LLP

(57) ABSTRACT

A process for altering the composition of a feed gas containing H₂S equivalents is disclosed. The process comprises (a) contacting the feed gas with a solid adsorbent at a temperature of 250-500° C., to obtain a loaded adsorbent, (b) purging the loaded adsorbent with a purge gas comprising steam, thus producing a product stream which typically contains substantially equal levels of CO₂ and H₂S. The process further comprises a step (c) of regenerating the purged adsorbent by removal of water. The adsorbent com- (Continued)

prises alumina and one or more alkali metals, such as potassium oxides, hydroxide or the like.

21 Claims, 7 Drawing Sheets

(51) Int. Cl.
*B01D 53/52* (2006.01)
*B01D 53/62* (2006.01)
*B01D 53/86* (2006.01)
*C01B 17/04* (2006.01)
*B01J 20/34* (2006.01)

(52) U.S. Cl.
CPC .......... *B01D 53/8603* (2013.01); *B01J 20/08* (2013.01); *B01J 20/3466* (2013.01); *C01B 17/0404* (2013.01); *B01D 2251/30* (2013.01); *B01D 2253/104* (2013.01); *B01D 2253/25* (2013.01); *B01D 2255/202* (2013.01); *B01D 2255/2022* (2013.01); *B01D 2255/2092* (2013.01); *B01D 2257/30* (2013.01); *B01D 2257/304* (2013.01); *B01D 2257/308* (2013.01); *B01D 2257/504* (2013.01); *B01D 2258/05* (2013.01); *B01D 2259/40086* (2013.01); *Y02C 10/04* (2013.01); *Y02C 10/08* (2013.01); *Y02P 20/152* (2015.11)

(58) Field of Classification Search
CPC .... B01D 2255/2022; B01D 2255/2092; B01D 2257/30; B01D 2257/304; B01D 2257/308; B01D 2257/504; B01D 2258/05; B01D 2259/40086; B01D 53/02; B01D 53/526; B01D 53/62; B01D 53/8603; B01J 20/08; B01J 20/3466; C01B 17/0404; Y02C 10/04; Y02C 10/08; Y02P 20/152
See application file for complete search history.

(56) References Cited

FOREIGN PATENT DOCUMENTS

| EP | 2 407 227 A1 | 1/2012 |
| EP | 2 412 668 A1 | 2/2012 |
| WO | WO-2010/059052 A1 | 5/2010 |
| WO | WO-2013/019116 A1 | 2/2013 |
| WO | WO-2013/122467 A1 | 8/2013 |
| WO | WO-2014/005817 A1 | 1/2014 |

* cited by examiner

PROCESS FOR REMOVING AND RECOVERING H$_2$S FROM A GAS STREAM BY CYCLIC ADSORPTION

CROSS-REFERENCE TO RELATED APPLICATIONS

This application is the National Phase of International Patent Application No. PCT/EP2015/076151, Nov. 10,2015, published on May 19, 2016 as WO 2016/075109A1, which claims priority to Netherlands Patent Application No. 2013759, filed Nov. 10, 2014. The contents of these applications are herein incorporated by reference in their entirety.

The present invention is in the field of removal of sour gases by adsorption, for example from syngas or Claus tail gas. Thus, the invention relates to an improved process for the selective removal of hydrogen sulphide (H$_2$S), and optionally further inorganic sulphide components such as carbonyl sulphide (COS) and carbon disulphide CS$_2$, from a gas stream by adsorption, particularly a gas stream comprising CO$_2$ and H$_2$S in a molar ratio above 0.5, and for recovering the inorganic sulphur as H$_2$S allowing valorisation thereof.

BACKGROUND

Hydrogen sulphide removal from sour gas streams is of great industrial importance, as such gases are the main known source of H$_2$S. An important source of sour gases is synthesis gas (syngas) containing hydrogen, carbon monoxide, carbon dioxide and further components including H$_2$S, or its subsequent product obtained by water gas shift (WGS) reaction, such as described in WO 2010/059052. The WGS reaction produces H$_2$ and CO$_2$ while H$_2$S can be present in the feed stream. In Sorbent-enhanced WGS, CO$_2$ and H$_2$S are adsorbed onto an adsorbent such as alkali-promoted hydrotalcite and subsequently simultaneously desorbed from the adsorbent. As such, CO$_2$ and H$_2$S end up in the same effluent stream, restricting efficient reuse or requiring purification of such gaseous mixtures.

Known techniques for selective removal of H$_2$S from a sour gas containing CO$_2$ include physical, chemical and hybrid scrubbing techniques and metal oxide scavenging. Chemical scrubbing involves the use of amine-based solvents that chemically react with sour gases such as H$_2$S and CO$_2$. Physical solvents involve e.g. methanol or glycol, using the physical dissolution of the acid gases obeying Henry's law, and hybrid solvents combining the best of both chemical and physical solvents. Because these solvents favour H$_2$S over CO$_2$ only slightly, H$_2$S enrichment yields are relatively poor, which renders this technique unsuitable for selective removal of H$_2$S from a CO$_2$-rich, H$_2$S-lean stream.

EP2407227 provides a method for separating H$_2$S from a sour syngas stream different from the aforementioned liquid absorption processes using a pressure swing adsorption system (PSA) to produce a stream enriched in CO$_2$ and H$_2$S, after which H$_2$S is removed for instance by using a packed bed of ZnO that would be disposed of and replaced when saturated with H$_2$S, or silica gels, impregnated activated carbons and/or molecular sieves. In one embodiment, steam is used to heat the bed that has been loaded with H$_2$S to help removing said H$_2$S. Scavengers, such as Zn-, Zn/Cu- or Fe-based scavengers, bind H$_2$S irreversibly and thus cannot economically deal with feeds comprising relatively high amounts of H$_2$S, such as typically 200 ppm H$_2$S or even only 100 ppm H$_2$S. Large scale processes or H$_2$S levels above about 100 ppm require frequent replacement of the scavenger bed, which is usually too expensive to be economically feasible.

WO 2013/019116 discloses a process for selectively removing acidic gaseous components, in particular carbon dioxide (CO$_2$) and hydrogen sulphide (H$_2$S), from an adsorbent which has adsorbed these gaseous components from a feed gas. It involves a CO$_2$ purge to replace the H$_2$S and a subsequent H$_2$O purge to remove the CO$_2$. The process is well suited for a Sorption-Enhanced WGS process, which produces H$_2$ and CO$_2$, and wherein (small) amounts of H$_2$S may be present. H$_2$S and CO$_2$ are subsequently separately separated from H$_2$.

There remains a need for enriching a gaseous stream in H$_2$S from a (CO$_2$-rich, H$_2$S-lean) feed stream that comprises intermediate amounts of H$_2$S (e.g. 100-10,000 ppm), for which scavenger and scrubbing techniques are unsuited. Existing H$_2$S enrichment techniques as described above can only achieve about one order of magnitude enrichment at high H$_2$S concentrations, and two orders of magnitude increase in concentration from low H$_2$S concentrations, for which a marked improvement is required.

SUMMARY OF THE INVENTION

The invention relates to a process for contacting a feed gas comprising H$_2$S and CO$_2$ to an adsorbent material for altering the composition of the gas, and is particularly suited for selectively removing H$_2$S from a feed gas which is preferably CO$_2$-rich and H$_2$S-lean, as defined further below, or in other words for enriching such feed in H$_2$S. At the same time, a CO$_2$-containing stream may be produced which is low in H$_2$S. In the process of the invention, H$_2$S equivalents, including H$_2$S, carbonyl sulphide (COS) and carbon disulphide (CS$_2$), are preferentially adsorbed onto the sorbent, followed by purging the adsorbent with a purging gas comprising steam, which gives rise to desorption of H$_2$S. In view of such effective desorption with steam, intermediate CO$_2$ rinses are rendered superfluous.

The process according to the invention is thus capable of selectively removing hydrogen sulphide from a gas and of realising up to three orders of magnitudes H$_2$S concentration increase compared to the feed stream. To that end, the inventors found that selective retention of H$_2$S (and/or equivalents thereof) could be improved by conditioning the water concentrations at contact between feed gas and solid adsorbent for selectively adsorbing H$_2$S (and/or equivalents thereof). This can be achieved by either drying the solid adsorbent or providing a gaseous feed low in H$_2$O, or, preferably, both.

The process according to the invention thus comprises:

(a) contacting a feed gas containing H$_2$S equivalents, CO$_2$ and optionally H$_2$O, wherein the molar ratio of H$_2$O to H$_2$S equivalents is within the range of 0-(5+X), with a solid adsorbent at elevated temperature, to obtain a loaded adsorbent and a first product gas;

(b) purging the loaded adsorbent with a purge gas comprising steam to obtain a second product gas.

Herein, the feed gas and/or the purge gas comprises a reducing agent such as hydrogen and the adsorbent comprises alumina and one or more alkali metals. In the molar ratio of H$_2$O to H$_2$S equivalents, which is in the range of 0-(5+X), X is defined as:

$$X = \sum \frac{n_i \times [\text{H}_2\text{S equivalent}]_i}{[\text{H}_2\text{S equivalents}]}$$

wherein [$H_2S$ equivalents] indicates the total concentration (typically in ppm) of $H_2S$ equivalents, [$H_2S$ equivalent]$_i$ indicates the concentration (typically in ppm) of a particular $H_2S$ equivalent i and $n_i$ indicates the amount of water molecules n consumed when said $H_2S$ equivalent i is converted to $H_2S$.

The term "$H_2S$ equivalents" as used herein denotes $H_2S$ and its gaseous or volatile sulphur equivalents which contain sulphur (formally) in oxidation state −2, such as carbonyl sulphide (COS) and carbon disulphide ($CS_2$). $H_2S$ equivalents are preferably selected from the group consisting of $H_2S$, COS, $CS_2$ and mixtures thereof. In this respect, COS and $CS_2$ are referred to as equivalents of $H_2S$. The term "$H_2S$ equivalents" does not includes higher valence sulphur species such as sulphur dioxide Preferably, the process comprises a further step (c) wherein the purged adsorbent is dried, after which the adsorbent is capable of adsorbing $H_2S$ equivalents again. As such, the adsorbent is regenerated and available for reuse in step (a) of the process again. The terms "adsorbent drying" and "adsorbent regeneration" are used interchangeably.

It was found that, advantageously, carbonyl sulphide (COS) and carbon disulphide ($CS_2$), if present in the feed gas, are removed together with the $H_2S$ when using the adsorbent of the present invention, not requiring a prior hydrolysis to $H_2S$ of these components. With the purging of step (b), all original $H_2S$ equivalents ($H_2S$, COS and $CS_2$ and the like) are released essentially as $H_2S$ only. The $H_2S$ enriched effluent (second product gas) is extraordinarily high in $H_2S$ content, thus rendering the effluent useful for further application in e.g. Claus sulphur production.

DETAILED DESCRIPTION

The invention relates in a first aspect to a process for altering the composition of a gas containing $H_2S$ equivalents and $CO_2$. In a second aspect, the invention relates to a Claus process wherein the process according to the first aspect is implemented. A third aspect of the invention concerns a system designed to implement the processes according to the first and second aspects of the invention, comprising a Claus unit and an adsorption module equipped with a bed of adsorbent comprising alumina and one or more alkali metals.

Process for Altering the Composition of a Gas

The first aspect of the invention more specifically relates to a process for selectively recovering $H_2S$ from a feed gas or enriching said gas in $H_2S$, wherein said feed gas comprises $CO_2$ and $H_2S$ equivalents, preferably in a molar ratio of $H_2S$ equivalents to $CO_2$ of less than 2, and optionally water, wherein the molar ratio of $H_2O$ to $H_2S$ equivalents is in the range of 0-(5+X). The process comprises (a) contacting the feed gas with a solid adsorbent, at a temperature of 250-500° C., to obtain a loaded adsorbent (the loading including $H_2S$) and a purified first product gas, (b) purging the loaded adsorbent with a purge gas comprising steam to obtain a gas enriched in $H_2S$ compared to the feed gas, and preferably (c) drying the purged adsorbent. The adsorbent comprises alumina and one or more alkali metals. The alkali metals are in particular in the form of their oxides, hydroxides, carbonates, sulphides, hydrosulphides, hydroxyl-carbonates, thiols, formates, hydroxyformates or the like, the (hydro)sulphides possibly being formed in the course of the adsorption process.

In the context of the present invention, the composition of gaseous mixtures is given in percentages (%) or ppm values. Unless indicated otherwise, these always refer to mole percentages or molar ratios. In the context of the invention, the term "gas" refers to any pure compound or mixture of compounds in the gas phase. A gas should be gaseous at the processing conditions, i.e. at least at a temperature of 250-500° C. and at a pressure of 1-15 bar, even though higher or lower pressures may be feasible as well. Under such conditions, water is in gaseous form, which may also be referred to as steam. Hence, the terms "water" (or "$H_2O$") and "steam" are used interchangeably in the context of the present invention. Solid compositions, such as for the adsorbent, are typically given in wt % (weight percentage) unless indicated otherwise. The adsorbent is solid at the processing conditions.

The feed gas may be referred to as "sour gas", which is a term of art for a gas containing at least 4 ppm hydrogen sulphide and/or equivalents thereof (see e.g. http://natural-gas.org/naturalgas/processing-ng/). Sour gases may be natural gases or may for example be generated during industrial processes (e.g. gasification of coal, biomass or mixtures thereof, e.g. the tail gas of a Claus process). The "sour gas" in the context of the invention contains $H_2S$ equivalents, $CO_2$ and optionally water (steam). However, large amounts of water hamper selective adsorption of $H_2S$ equivalents to the adsorbent, so water should be present in the feed stream in a molar ratio of $H_2O$ to $H_2S$ equivalents in the range of 0 to (5+X), preferably 0 to (2+X), even more preferably 0 to (1+X), most preferably 0 to 1. Herein, X is a constant, the value of which depends on the type and amount of equivalents of $H_2S$ present in the feed gas, taking into account the consumption of $H_2O$ during conversion of such equivalent to $H_2S$. Each equivalent of $H_2S$ allows for a different maximal steam content. X is further defined below. Herein, a molar ratio of 0 (zero) refers to the complete absence of steam. In absolute terms, the water (steam) level in the feed gas is preferably below 20%, more preferably below 5%, even more preferably below 2%, most preferably below 0.5%. Although it is preferred that the feed gas is completely dry without any water present, the process according to the first aspect of the invention runs sufficiently effective even when a minor amount of water is present. Typically, the molar ratio of $H_2O$ to $H_2S$ equivalents may be at least 0.001 or at least 0.01 or at least 0.1 or even at least 0.5, or in absolute terms, the feed gas may contain at least 50 ppm water or at least 100 ppm water or even at least 500 ppm water. This implies that source gases containing appreciable levels of water, such as Claus tail gases, may have to be dried, e.g. by condensation, adsorption, absorption or other conventional methods, to below the above levels, before being subjected to the process of the invention.

The feed gas comprises $H_2S$ equivalents as defined herein. In the context of the present invention, the term "$H_2S$ equivalents" denotes $H_2S$ and its gaseous or volatile sulphur equivalents which contain sulphur (formally) in oxidation state −2, such as carbonyl sulphide (COS) and carbon disulphide ($CS_2$). $H_2S$ equivalents preferably comprise $H_2S$, COS and/or $CS_2$, more preferably are selected from the group consisting of $H_2S$, COS, $CS_2$ and mixtures thereof. In this respect, COS and $CS_2$ are referred to as equivalents of $H_2S$. The term "$H_2S$ equivalents" does not include higher valence sulphur species such as sulphur dioxide. Typically, but not mandatorily, the $H_2S$ equivalents include $H_2S$ as such, and preferably, they also include COS and/or $CS_2$. The combined content of $H_2S$ equivalents in the feed gas typically ranges from 5 ppm to 5% (50,000 ppm), preferably 10-25,000 ppm (2.5%), more preferably 100-10,000 ppm, even more preferably 150-5000 ppm, most preferably 200-2000 ppm. It is noted that COS and $CS_2$ were found to be adsorbed in step (a) and converted to $H_2S$ upon steam purging of step (b). Regardless of the type of $H_2S$ equivalent(s) present in the feed gas, the second product stream, i.e. the effluent of step (b), will contain $H_2S$ as sole sulphur species. COS and $CS_2$, as well as $H_2S$ itself, are desorbed as $H_2S$. These species are thus considered equivalent to $H_2S$.

Without being bound to a theory, it is expected that during the operating conditions, two equilibria are established for which the adsorbent acts as a catalyst. These two equilibria are:

$$COS + H_2O \leftrightarrow H_2S + CO_2 \qquad (1)$$

$$CS_2 + 2H_2O \leftrightarrow 2H_2S + CO_2 \qquad (2)$$

Upon breakthrough, i.e. complete loading of the adsorbent with $H_2S$ equivalents, $H_2S$ equivalents end up in the first product gas, since they can no longer be adsorbed. The inventors found that regardless of whether $H_2S$, COS or $CS_2$ (or mixture thereof in any ratio) is present in the feed gas, $H_2S$ and COS are observed in the first product gas in their equilibrium concentrations according to equilibrium (1). No $CS_2$ is observed, since equilibrium (2) is completely shifted to the right under the processing conditions, i.e. equilibrium concentration of $CS_2$ is (close to) 0.

As is clear from equilibrium (1), one molecule of COS is equivalent to one molecule of $H_2S$, wherein one molecule of $H_2O$ is consumed. Thus, for each molecule (or mole) of COS present in the feed stream, one additional molecule (or mole) of $H_2O$ may be present therein. Likewise, as is clear from equilibrium (2), one molecule of $CS_2$ is equivalent to two molecules of $H_2S$, wherein two molecules of $H_2O$ are consumed. Thus, for each molecule (or mole) of $CS_2$ present in the feed stream, two additional molecules (or moles) of $H_2O$ may be present therein. For this reason, the allowable water content in the feed gas employs the factor X. Thus, the ratio of $H_2O$ to $H_2S$ equivalents is in the range of 0-(5+X), preferably 0-(2+X), even more preferably 0-(1+X), wherein X is defined as:

Herein, [$H_2S$ equivalents] indicates the total concentration (typically in ppm) of $H_2S$ equivalents, [$H_2S$ equivalent]$_i$ indicates the concentration (typically in ppm) of a particular $H_2S$ equivalent i and $n_i$ indicates the amount of water molecules n consumed when said $H_2S$ equivalent i is converted to $H_2S$. Thus, $n_i=0$ for i=$H_2S$, $n_i=1$ for i=COS and $n_i=2$ for i=$CS_2$. For the preferred situation where the $H_2S$ equivalents are selected from $H_2S$, COS, $CS_2$ and mixtures thereof, X simplifies as:

Herein, [COS] and [$CS_2$] indicate the concentration (typically in ppm) of COS and $CS_2$ respectively, and [$H_2S$ equivalents]=[$H_2S$]+[COS]+[$CS_2$]. In case the $H_2S$ equivalents only contain $H_2S$, i.e. the feed gas does not comprise detectable amounts of other $H_2S$ equivalents, X=0. Since X defines the upper limit of the allowable range of $H_2O$ to $H_2S$ in the feed gas, X may not exceed the above-defined values, as that would render the feed gas too wet for effective performance of the process according to the first aspect of the invention. For example, one molecule of COS requires one molecule of $H_2O$ (or consumes one molecule of $H_2O$) for conversion to one molecule of $H_2S$, so $n_{(COS)}=1$. Thus, when the feed gas comprises COS as the only $H_2S$ equivalent, X=1 and the maximal allowable water content of the feed gas defined as the ratio of $H_2O$ to $H_2S$ equivalent is 6. Similarly, a 9 to 1 $H_2S$ to COS mixture gives X=0.1 and results in a maximal allowable ratio of $H_2O$ to $H_2S$ equivalent of 5.1. Pure $CS_2$ gives X=2 and results in a maximal allowable ratio of $H_2O$ to $H_2S$ equivalent of 7. In one embodiment, X=0 and the $H_2O$ to $H_2S$ equivalents ratio is 0-5, preferably 0-2, more preferably 0-1.

The feed gas may also be referred to as a "$CO_2$-rich, $H_2S$-lean" feed gas, meaning that the molar ratio of $H_2S$ equivalents to $CO_2$ is preferably below 1, more preferably below 0.1, even more preferably between 0.0001 and 0.05, most preferably in the range of 0.001-0.02 or even 0.002-0.01. $CO_2$ levels of the feed gas may vary greatly without negatively affecting the process. They typically range from 100 ppm to 99%, preferably at least 500 ppm and up to 95%, more preferably from 0.5% (5000 ppm) up to 50%, most preferably 3-25%.

In addition to the acidic or "sour" species, other, essentially non-acidic, components may also be present, including hydrogen, carbon monoxide, hydrocarbons or other fuel gases, water, as well as any amount of inert gaseous species such as nitrogen, noble gases (e.g. helium, argon) and the like. The level of oxygen should preferably be low, e.g. below 2%, preferably below 0.5% or even below 0.1% (1000 ppm). The presence of higher levels of $O_2$ is undesirable, as this creates an oxidizing environment wherein $SO_2$ may be formed. Thus, the presence of $O_2$ counteracts the effect of the reducing agent which is preferably present in the feed gas. As discussed, the water content should also be kept low.

The feed gas typically further comprises a reducing agent. Although less preferred, the feed gas could also be free of a reducing agent, in which case it might be required to periodically regenerate the bed of adsorbent material. Such bed regeneration could be effected by reduction using a reducing agent as defined herein, optionally assisted by heating the bed to aid the decomposition of deactivating components. The reducing agent in the context of the present invention is a gaseous species capable of reducing oxidised species, typically capable of preventing the oxidation of $H_2S$ to $SO_2$ or sulphates, under the process conditions. During the purging of step (b), the adsorbed $H_2S$ species are in contact with great excess of $H_2O$ molecules, which may oxidise $H_2S$ (and/or equivalents thereof) to $SO_2$ or even sulphates, under the process conditions. A reducing environment suppresses such oxidation. The inventors surprisingly found that the presence of a reducing agent in the feed gas, i.e. during the contacting of step (a), suppresses such oxidation during step (b). Alternatively, the purging gas may comprise the reducing agent, as described further below, which also suppresses such oxidation. If no reducing agent is present in both the feed gas and the purging gas, significant amounts of the adsorbed $H_2S$ are converted to sulphates during step (b), which are not capable of desorbing from the adsorbent. Preferably, the reducing agent is selected from $H_2$ and/or CO, more preferably the feed gas comprises at least $H_2$ as reducing agent. The feed gas preferably comprises 0.1-50%, more preferably 0.5-30%, most preferably 1-20% reducing agent, most preferably $H_2$. The presence of a reducing agent thus suppresses the formation of sulphates on the adsorbent, for which the adsorbent may act as catalyst. The presence or formation of $SO_2$ is undesirable, since it is adsorbed during step (a) and when contacted with steam during step (b), $SO_2$ reacts to sulphate which is not readily desorbed upon purging with steam. Thus, the presence or formation of $SO_2$ and/or the absence of a reducing agent decreases the adsorption capacity of the adsorbent.

It is thus also preferred that the feed gas does not contain appreciable levels of $SO_2$ (or other sulphur oxides, together referred to as $SO_x$); preferably it contains less than 0.5% (5000 ppm), more preferably less than 0.05% (500 ppm), most preferably less than 50 ppm. In a particular embodiment, the feed gas contains substantially no (i.e. less than 10 ppm) of $SO_2$. In an especially preferred embodiment, the content of $CO_2$ and $H_2$ is substantially equal (ratio between 1:2 and 2:1). CO may also be present, e.g. in an amount of 0.05-30%, more preferably 0.1-20%, most preferably 0.5-10%. Since the feed gas preferably contains syngas, it is preferred that the level of $H_2$ and CO is substantially equal, i.e. molar ratio $H_2$:CO is 1:2-2:1.

According to a preferred embodiment of the invention the process is used for the separation $H_2S$ from sour natural gas, syngas (e.g. general, biomass-derived or coal-derived), Claus tail gas, $H_2S$-containing gaseous fuels, tail gas of hydrodesulphurisation, wherein sulphur species are removed from gaseous streams (e.g. of petroleum products of refineries) by hydrogenation to $H_2S$. Such gases are preferably used as feed gas in step (a) of the process according to the invention. $H_2S$ is readily separated from $H_2S$-containing gaseous fuels by the process according to the invention, wherein the fuel depleted in $H_2S$ is obtained as first product gas. The adsorbent according to the invention does not adsorb hydrocarbon species, which thus leads to no loss in fuel during the adsorption of step (a). Amine scrubbing to remove sulphur species will always lead to some removal of hydrocarbons, thus leading to fuel loss. Preferred feed gases include $H_2S$-containing gaseous fuels, syngases and Claus tail gases, in particular, syngases and Claus tail gases having typical compositions as given in Table 1 below. Herein "inert" gases comprise nitrogen, noble gases and the like and the values for $H_2S$ include COS and $CS_2$. Most preferably, a Claus tail gas is used as feed gas, since the process according to the first aspect of the invention is especially suitable to be incorporated with a Claus process. In this respect, it is especially preferred that the second product gas is used as incoming gas for a Claus process. These aspects of the invention are discussed further below.

In one embodiment, the feed gas has been pre-treated prior to being subjected to step (a) of the process according to the first aspect of the invention. Pre-treatment may be employed to lower the $H_2O$ content and/or the $SO_2$ content (or the $SO_x$ content). Pre-treatment to lower the $SO_2$ or $SO_x$ content is particularly preferred for Claus tail gases and typically involves subjecting a $SO_x$-containing gas to a hydrogenation-hydrolysis step, as known to the art, to convert $SO_x$ to $H_2S$. $SO_x$ can also be lowered by scrubbing with an alkaline solution followed by chemical reduction, e.g. using hydrogen, or by biological reduction, e.g. using bacteria of the genera *Desulfovibrio, Desulfobacterium, Desulforomonas* or the like. Alternatively, the $SO_2$ or $SO_x$ content of the Claus tail gas can be lowered by tuning of the oxidation step(s) in the Claus process itself.

Pre-treatment to lower the $H_2O$ content is particularly preferred in case the $H_2O$ content of a potential feed gas is too high, i.e. the molar ratio of $H_2O$ to $H_2S$ equivalents is above (5+X). Where necessary, the $H_2O$ level of the feed gas is lowered e.g. by cooling and/or pressurisation resulting in condensation of water or by other conventional methods such as absorption or adsorption. Since drier feed gases give rise to increased $H_2S$ adsorption capacity of the adsorbent, it is preferred that pre-treatment to lower the $H_2O$ content includes a measure to lower the $H_2O$ level to well below 1%. Such a measure may include a glycol rinse of the feed gas and/or contacting the feed gas with molecular sieves, optionally after one or more of the above-mentioned techniques. Alternatively or additionally, the $H_2O$ content may be lowered by selective permeation of water through a membrane (e.g. by vacuum permeation). Feed gases pre-treated as such are especially suitable to be used as feed gas for the process according to the first aspect of the invention, in view of their extremely low or even negligible water content. Pre-treatment to lower the $H_2O$ level is also referred to as drying or "pre-drying".

TABLE 1

| Typical gaseous compositions (in vol %) | | | | | | |
|---|---|---|---|---|---|---|
| | $H_2$ | CO | $CO_2$ | $H_2O$ | $CH_4$ | inert | $H_2S$ |
| Syngas general | 25-45 | 20-60 | 5-25 | 2-30 | 0-15 | 0.5-5 | 0.01-1 |
| Biomass-derived | 30-45 | 20-30 | 15-25 | 2-10 | 5-15 | 2-5 | 0.002-0.05 |
| Coal-derived | 25-30 | 30-60 | 5-15 | 2-30 | 0-5 | 0.5-5 | 0.2-1 |
| Claus tail gas | 0.2-5 | 0-1 | 1-10 | 15-50 | 0-1 | 40-75 | 0.5-5 |

The adsorbent to be used in the process of the invention is capable of adsorbing $H_2S$ and comprises a mixture of inorganic (hydr)oxides comprising a trivalent metal oxide, especially alumina (aluminum oxide or hydroxide). Instead or in addition to aluminum, other metals capable of adopting a trivalent state may be present, such as Fe, Mn, Cr, Ti, Pd, Ce and Zr. Apart from being highly effective in the process according to the invention, the use of alumina in the adsorbent according to the invention has further advantages. First of all, aluminas are highly stable towards reducing condition that occur during the process according to the invention, in contrast to e.g. tin oxide based materials. Also the hydrothermal stability (i.e. the inertness towards steam at high temperature) of aluminas, especially hydrotalcites, is excellent, thus preventing sintering of the adsorbent material under the process conditions. Sintering is especially disadvantageous, since it reduces the surface area of the adsorbent and thus the adsorbent capacity. The alumina of the adsorbent according to the invention is promoted with, i.e. contains, one or more alkali metals, in ionic form, e.g. as their oxides, hydroxides, carbonates, or in situ, sulphides and/or hydrosulphides. Preferably the adsorbent comprises one or more alkali metal oxides, hydroxides and/or carbonates, more preferably one or more alkali metal oxides or carbonates. Any alkali metal can be used, including Li, Na, K, Rb and Cs. Preferred alkali metals are Na and K, most preferably K is used as alkali metal. The alkali metal content of the adsorbent is preferably 2-30 wt %, more preferably 5-25 wt %, most preferably 10-15 wt %.

The adsorbent may advantageously further comprise one or more divalent metal oxides, hydroxides, carbonates, sulphides and/or hydrosulphides. The divalent metals can be an alkaline earth metal (Mg, Ca, Sr, Ba) or Co, Ni, Cu, Zn, Cd, Pb. Preferred divalent metals are Mg, Ca, Sr, Ba, Zn, Ni and Cu. More preferably, the adsorbent comprises calcium oxide and/or magnesium oxide and/or zinc oxide. In particular, the adsorbent has an atomic ratio of divalent metals (especially one or more of Mg, Ca, Zn) to Al of between 0 and 3, preferably between 0.05 and 1.5, e.g. between 0.11 and 1.0, and an atomic ratio of alkali metal (especially Na and/or K) to Al of between 0.1 and 1.0, preferably between 0.15 and 0.75, most preferably between 0.25 and 0.5. Aluminas also containing alkali metals, possibly in addition to other metals and counter ions, are referred to herein as "alkali-promoted" aluminas. Alkali-promoted alumina, not containing divalent metals, are well suitable in the present process. A specific and preferred example of a suitable adsorbent is K-promoted alumina The K-promoted alumina preferably comprises 5-25 wt % K, more preferably 10-15 wt % K, based on total weight of the adsorbent.

When the adsorbent further comprises magnesium oxide (magnesia), it preferably has an atomic Mg to Al+Mg ratio of between 0.05 and 0.85, more preferably between 0.1 and 0.8, most preferably between 0.2 and 0.5. Aluminas that further comprise magnesia are referred to as "hydrotalcites". Where reference is made to alumina, magnesia and the like, these include the oxides, but also hydroxides and other equivalents of the oxides of aluminum, magnesium, respectively. Herein, sulphides and hydrosulphides are considered equivalent with oxides and hydroxides respectively. It is envisioned that upon adsorption of sulphur species such as $H_2S$ metal oxides and hydroxides present in the adsorbent are converted into sulphides and hydrosulphides. When present, metal sulphides and hydrosulphides are likely to be transformed to metal oxides and hydroxides. It is however preferred that at least metal oxides are present in the adsorbent. Magnesium is particularly preferred over e.g. zinc, for feed gas mixture containing high amounts of sulphur-containing species such as $H_2S$, since the magnesium-based adsorbents were found to be chemically relatively insensitive to the sulphur compounds, i.e. not be deteriorated in use.

Aluminas also containing magnesium and/or other divalent metals, and also containing alkali metals, possibly with other metals and counter ions, are referred to herein as "alkali-promoted hydrotalcites". The aluminas may be used in a manner known per se, which may comprise admixing metals oxides and further additives with the alumina or hydrotalcite or other base material in a dry state or in a solution or a slurry, and optionally drying and calcining the resulting mixture. The alumina may be any form of alumina which can be rehydrated, in particular which has a level of hydroxyl groups. Examples include gamma-alumina, boehmite, gibbsite, bayerite.

The adsorbent to be used in the process according to the first aspect of the invention can be represented by the following chemical formula:

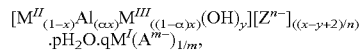
$$[M^{II}_{(1-x)}Al_{(\alpha x)}M^{III}_{(1-\alpha)x}(OH)_y][Z^{n-}]_{((x-y+2)/n)}$$
$$\cdot pH_2O \cdot qM^{I}(A^{m-})_{1/m},$$

wherein:

$M^I$ is one or more metals selected from Li, Na, K, Rb and Cs, preferably from Na and K;

$M^{II}$ is one or more metals selected from Mg, Ca, Sr, Ba, Co, Ni, Cu, Zn, Cd and Pb, preferably from Mg, Ca, Ni, Cu and Zn;

$M^{III}$ is one or more metals selected from Fe, Mn, Cr, Ti and Zr;

$Z^{n-}$ is one or more anions selected from halide, nitrate or acetate (n=1), or oxide, sulphate, oxalate or carbonate (n=2);

$A^{m-}$ is one or more anions selected from hydroxide (m=1) and the anions as defined for Z above, with m corresponding to n;

m and n=1 or 2, according to A and Z, respectively;

x=0.05-1, preferably 0.1-1.0, more preferably 0.2-0.95, most preferably 0.4-0.8;

α=0-1, preferably 0.5-1, most preferably α=0.95-1;

p=0-15;

q=0.1-1; and y=0-4.

Specific examples of hydrotalcites of the above formula are referred to herein as KMG30 having an $MgO:Al_2O_3$ weight ratio of 30:70 and having the formula $[Mg_{0.35}Al_{0.65}(OH)_2][CO_3^{2-}]_{0.325} \cdot 0.5H_2O \cdot 0.32K(CO_3^{2-})_{0.5}$ with a molar ratio K:Mg:Al of about 1.0:1.1:2.0 and a molar ratio of K:(Mg+Al) in the order of 1:3.1 (0.32:1); and as KMG70 having an $MgO:Al_2O_3$ weight ratio of 70:30 and having the formula $[Mg_{0.74}Al_{0.26}(OH)_2][CO_3^{2-}]_{0.13} \cdot 0.5H_2O \cdot 0.27K(CO_3^{2-})_{0.5}$ with a molar ratio K:Mg:Al of about 1.0:2.7:0.9 and a molar ratio of K:(Mg+Al) in the order of 1:3.6 (0.27:1)

The anions in the complex metal oxides are as defined above. Preferably the adsorbent comprises hydroxide and/or carbonate anions in order to ensure sufficient alkalinity for an effective adsorption of acidic gas species. In particular, at least 50% of the anions (expressed in monovalent equivalents) consist of hydroxide and/or carbonate.

Suitable inorganic oxides can have a layered structure, wherein part of the anions is arranged in layers interposed between layers containing the cations. Examples of suitable layered oxides include the hydrotalcites having proportional formula's such as $Mg_6Al_2(CO_3)(OH)_{16} \cdot 4(H_2O)$ or similar combinations with different Mg:Al ratios. Other suitable oxides include analogues wherein magnesium is absent (e.g. scarbroite) or is replaced by calcium (e.g. alumohydrocalcites), strontium (e.g. montroyalite) or barium (e.g. dreserrites), as well as Mg/Fe, Mg/Cr, Mg/Mn, Ni/Al, etc. analogues (pyroaurite, stichtite, desautelsite, takovite).

In a preferred embodiment, the adsorbent as prepared for step (a) of the process of the invention has a $H_2O$ content of at most 5 wt %, based on the total weight of the adsorbent. In order to obtain such $H_2O$ contents, it may be beneficial to dry the adsorbent prior to step (a). Methods and means for drying the adsorbent are known in the art and described further below in the context of the regeneration of step (c).

The adsorbent may have been thermally treated, i.e. it may have been heated at a temperature above about 200° C., even more especially above about 400° C. For instance, assuming a hydrotalcite adsorbent, when heating this hydrotalcite in the reactor before or during an adsorption-desorption reaction, the hydrotalcite modifies to a promoted alumina, such as $K_2CO_3$ and MgO promoted alumina, since at elevated temperatures, the hydrotalcites may at least partially rearrange in mixed oxides while losing hydrotalcite crystalline structure and layered double hydroxide structure. This is well known in the art and is for instance described in U.S. Pat. Nos. 5,358,701, 6,322,612 and WO 2005/102916.

During step (a) of the process according to the first aspect of the invention, the feed gas is contacted with the adsorbent at a temperature of 250-500° C., preferably of 280-450° C., more preferably 300-420° C. Step (a) is preferably performed at a pressure of below 15 bar, such as 1-15 bar, more preferably 1-10 bar, for a period of at least 5 minutes, such as 10 minutes—e.g. 12 h, preferably 30 minutes—8 h. The flow rate of the feed gas in step (a) may be e.g. 1-25 m$^3$ per kg of sorbent per h, preferably 4-20 m$^3$/kg/h. During the contacting, certain species, in particular acidic species, are adsorbed onto the adsorbent, while other species may pass through the adsorbent material without being adsorbed ("slip through"). Such non-adsorbed species typically included inert gases such as nitrogen, argon and hydrocarbons. Together, the non-adsorbed species form a first product gas, which is depleted in acidic species, particularly in $H_2S$ equivalents, compared to the feed gas. The first product gas is thus the off-gas of step (a). Step (a) is preferably continued until breakthrough of $H_2S$ equivalents commences, which end up as a mixture of $H_2S$ and COS in the first product gas as explained above. It should be noted that the conditions during step (a) are typically such that no water gas shift reaction occurs.

The inventors surprisingly found that when the water content of the feed gas is sufficiently low, the adsorbent material according to the invention has an increased selectivity for $H_2S$ (and/or equivalents thereof), when compared to adsorption by the same adsorbent with a "wet" feed gas, i.e. having a $H_2O$ to $H_2S$ equivalents molar ratio of above (5+X). With such a wet feed gas, the adsorbent adsorbs relatively large amounts of $CO_2$ while adsorbing comparatively low amounts of $H_2S$, e.g. as described in WO 2013/019116. Although the concentration of $CO_2$ of the feed gas is typically several factors higher than the concentration of $H_2S$ equivalents in the feed stream, the molar ratio of $H_2S$ (and/or equivalents thereof) to $CO_2$ that is adsorbed onto the adsorbent is surprisingly high, even above 1, when a dry feed gas is used. In this respect, it is irrelevant whether the equivalents of $H_2S$, typically COS and/or $CS_2$, are converted to $H_2S$ when being in the gaseous state and subsequently adsorbed as $H_2S$, or that the equivalents of $H_2S$ are first adsorbed as such and subsequently converted to $H_2S$. The sulphur species that is desorbed during step (b) is at all times $H_2S$, and the second product gas is substantially free of equivalents of $H_2S$ such as COS and $CS_2$. Without being bound to a theory, it is believed that the adsorbent acts as catalyst for the conversion of the equivalents of $H_2S$ to $H_2S$, and that the conversion occurs when an equivalent of $H_2S$ is in adsorbed state. In the context of the present invention, reference is made to adsorption of $H_2S$ equivalents.

The inventors found that increasing amounts of water in the feed gas decreases the selectivity for $H_2S$ equivalents. As the amount of $H_2S$ equivalents being adsorbed during step (a) decreases, the $H_2S$ content in the second product gas, i.e. the off-gas of step (b), decreases. The $H_2S$ content in the second product gas becomes unacceptably low when the ratio of $H_2O$ to $H_2S$ equivalents in the feed gas is above (5+X). The drier the feed gas the higher the capacity of the adsorbent for $H_2S$ equivalents, thus it is preferred that the $H_2O$ to $H_2S$ equivalents ratio in the feed gas is 0 or close to 0. When the $H_2O$ to $H_2S$ equivalents ratio is in the range of 0-(5+X), preferably 0-(2+X), more preferably 0-(1+X), the sorbent capacity for $CO_2$ and $H_2S$ equivalents is more or less similar, i.e. $CO_2$ to $H_2S$ adsorption is 2:1-1:2, in step (a) of the process according to the first aspect of the invention. For completely dry feed gases, i.e. having a $H_2O$ to $H_2S$ equivalents ratio of 0 or close to 0, the ratio of $CO_2$ to $H_2S$ being adsorbed in step (a) was as high as 1.5, which slightly decreased to 0.6 for a feed gas comprising $H_2O$ and $H_2S$ equivalents in a ratio of about 2. Such capacities for $H_2S$ equivalents afford excellent second product gases in terms of $H_2S$ content and $H_2S$ to $CO_2$ ratios. $H_2S$ capacities of the adsorbent were found acceptable for feed gases comprising water up to a $H_2O$ to $H_2S$ ratio of (5+X).

In view of the adsorption of $H_2S$ equivalents during step (a), the first product gas, i.e. the gas issuing from step (a), is depleted in $H_2S$; it typically contains substantially no $H_2S$, i.e. less than 10 ppm, advantageously less than 5 ppm or even less than 1 ppm. The first product gas generally contains less than 0.1 times, preferably 0.05 times, most preferably less than 0.02 times the level of $H_2S$ equivalents of the feed gas, and the level may be as low as 0.001 or even 0.0002 times the feed level. Alternatively, or additionally, the first product gas has a molar ratio $H_2S$ equivalents to $CO_2$ of less than 0.005, preferably less than 0.002, down to e.g. 0.0001 or even 0.00001. When compared to the feed gas, the first product gas has an decreased ratio of $H_2S$ equivalents to $CO_2$.

The first product gas may be emitted into the environment, which is acceptable in view of its negligible sulphur content, although incineration of the first product gas prior to emission may be desired in case it contains hydrocarbons, CO and/or $H_2$. In view of its low sulphur content and potentially high $CO_2$ content, depending on the $CO_2$ content of the incoming feed gas, the first product gas may also be suitable for carbon capture and storage (CCS). Alternatively, it may be used or further processed in any way conceivable, e.g. as a high-$CO_2$ source gas, fuel gas or syngas.

The contacting of step (a) may be performed by any means known in the art for contacting a gaseous stream with a solid material. Typically, a packed bed reactor is used, e.g. in the form of a column or tube wherein a tubular reactor is packed with the adsorbent material, although a fluidised bed may also be used. The stream of the feed gas is led over or through said reactor. In case a column is used, the feed gas is conveniently injected into the adsorbent, e.g. at the bottom or top of the column, and the first product gas is released, conveniently at the other side of the column. Alternative arrangements, including horizontal flows or flow entering and leaving the column at the long sides, are also well suitable. After contacting step (a), the adsorbent has been become loaded with acidic species, in particular $H_2S$ and $CO_2$.

In step (b), the adsorbed molecules are desorbed from the adsorbent, by purging (rinsing) with a purging gas. The purging gas used in step (b) comprises steam, preferably the purging gas is steam, although minor amounts of other components such as $N_2$, Ar, $H_2S$ or $CO_2$ may also be present in the purging gas. It is preferred that the content of other gases than steam and optionally inert gases is kept low. Preferably at least 75% of the purging gas is steam and optionally inert gas(es), more preferably at least 90%, most preferably at least 95% is steam and optionally inert gas(es). Typically, the ratio of steam to inert gas is in the range of 5/95-100/0, more preferably 20/80-100/0, even more preferably 50/50-100/0, most preferably 90/10-100/0. The $CO_2$ content is kept low, preferably below 0.1% (1000 ppm), especially below 100 ppm or even below 10 ppm. The presence of $CO_2$ is not required for effective desorption and only leads to a reduced $H_2S$ content in the first effluent, compared to the $CO_2$ content (i.e. decreasing the $H_2S/CO_2$ molar ratio). It is also preferred to keep the $H_2S$ content low in the purging gas, preferably 0-1%.

In one embodiment, the purging gas comprises a reducing agent. The type and content of the reducing agent comprised in the purging gas is typically the same as defined above for the feed gas. The presence of a reducing agent in the purging gas ensures that any adsorbed $SO_x$ species is reduced to $H_2S$ upon desorption. It is preferred that the feed gas comprises a reducing agent as defined above, and the purging gas is substantially free of reducing agent (i.e. comprises <1% reducing agent, especially below 100 ppm or even below 10 ppm). In an especially preferred embodiment, the purging gas is substantially pure steam, i.e. comprising at least 95% steam or even at least 99% steam or about 100% steam. Any further component, apart from steam, that is present in the purging gas reduces the $H_2S$ and $CO_2$ content of the second product gas, based on dry weight. The potentially large amounts of water that are present in the second product gas are readily reduced by e.g. condensation. In an alternative embodiment, the purging gas is a Claus tail gas that has not been subjected to drying. The $H_2O$ present in the Claus tail gas enables desorption of $H_2S$, thus giving rise to a Claus tail gas enriched in $H_2S$ as second product gas.

The temperature at which step (b) is performed preferably ranges from 250-500° C., more preferably 300-450° C. Step (b) is preferably performed at a pressure of below 15 bar, such as 1-15 bar, more preferably 1-10 bar, for a period of between 10 minutes and e.g. 48 h, preferably between 20 minutes and 24 h. The flow rate of the purge gas in step (b) may be similar to the flow rate of step (a), e.g. 1 to 25 $m^3$ per kg of sorbent per h, preferably 4-20 $m^3$/kg/h. Although the temperatures and pressures employed in steps (a) and (b) may vary, the process is advantageously performed with steps (a) and (b) at about the same temperature and pressure. Thus, any difference in temperature between step (a) and step (b) is preferably less than 50° C., more preferably less than 20° C., and any difference in pressure between step (a) and step (b) is preferably less than 50%, more preferably less than 25%, or less than 1 bar. In other words, no pressure swing (i.e. a cycle comprising relatively high-pressure adsorption and relatively low-pressure desorption) or temperature swing (i.e. a cycle comprising relatively low-temperature adsorption and relatively high-temperature desorption) is required to obtain $H_2S$ enrichment according to the present invention. Step (b) may be performed in co-current mode or counter-current mode with respect to adsorption step (a). For optimised desorption, it is preferred that step (b) is performed in counter-current mode with respect to step (a).

In a preferred embodiment, the process according to the first aspect of the invention runs in parallel, i.e. at least two reactor beds comprising the adsorbent according to the invention, preferably in separate reactors, are used simultaneously, one is performing step (a), i.e. is being fed with the feed gas and expels the first product gas, and the other one is performing step (b), i.e. is being fed with the purge gas and expels the second product gas. Preferably, the bed operating in step (b) subsequently performs step (c), as described below, before the beds are switched and the now loaded bed is subjected to step (b) and the now purged and preferably dried bed is subjected to step (a). Alternatively, a third bed may be used, which is subjected to step (c) while a first bed is being subjected to step (a) and a second bed is being subjected to step (b). In this embodiment, the two, three or more beds operate according to the cyclic scheme of step (a)→step (b)→step (c)→step (a)→etc.

During purging with a purging gas comprising steam, water molecules occupy adsorption sites on the adsorbent, thereby releasing the acidic species such as $H_2S$, $CO_2$ that were adsorbed during step (a). These desorbed species, together with a large part of purging gas that is not adsorbed, make up a second product gas stream (effluent). The second product gas is a main product of the process according to the first aspect of the invention, and is enriched in $H_2S$ compared to the feed gas. Here, "enrichment" refers to the increased content of $H_2S$ (based on dry weight) compared to the content of $H_2S$ equivalents in the feed gas (based on dry weight) and/or to the increased molar ratio of $H_2S$ (and/or equivalents thereof) to $CO_2$ compared to the feed gas. It should be noted that the second product gas is substantially free of equivalents of $H_2S$, since all sulphur species that are adsorbed during step (a) are desorbed as $H_2S$ during step (b). When compared to the feed gas, the second product gas has an increased ratio of $H_2S$ equivalents to $CO_2$. The molar ratio of $H_2S$ to $CO_2$ in the second product gas is typically increased to between about 1 and about 2, whereas the $H_2S$ equivalents to $CO_2$ molar ratio in the feed gas may be as low as 0.001 or even lower. As such, an enrichment up to three orders of magnitude may be achieved, which is unprecedented in the art.

The second product gas typically contains $H_2S$, $CO_2$ and $H_2O$. It may further contain nitrogen as well as low levels of noble gases, carbon monoxide, hydrocarbons, depending on the composition of the purge gas, while it is preferred that the combined level of such further components, other than $H_2S$, $CO_2$ and $H_2O$, is less than 10%, more preferably less than 5%. Preferably, the $H_2S$ content of the second product gas is 5-75%, more preferably 10-70%, most preferably 20-60%, based on dry weight of the gas. Likewise, the $CO_2$ content of the second product gas is preferably below 70%, more preferably below 50%, even more preferably below 40%, based on dry weight of the gas. Most preferably, the $CO_2$ content is below 30%. Although an as low as possible $CO_2$ content is preferred, some $CO_2$ will typically end up in the second product gas, in view of adsorption thereof in step (a) and subsequent desorption in step (b). Thus, the typical $CO_2$ levels of the second product gas are 2-40%, or 5-35%, or even 10-30%, based on dry weight of the gas. It is especially preferred that the $H_2S$ content is substantially equal or higher than the $CO_2$ content. The second product gas of the process of the invention has a molar ratio $H_2S$ equivalents to $CO_2$ of at least 0.25, preferably at least 0.5, up to e.g. 10, most preferably in the range of 0.75-2.

It is further preferred that the combined level of $H_2S$ and $CO_2$ is between 10 and 95%, more preferably between 20 and 80%, based on dry weight of the gas. Since COS and $CS_2$ were found to readily adsorb and desorb under the conversion to $H_2S$ and not to revert to COS or $CS_2$ upon desorption, no or only a negligible amount of COS and $CS_2$ is observed in the second product gas. Also hardly any or even an untraceable amount of $SO_x$ is observed in the second product gas, in view of the presence of a reducing agent, even if the reducing agent is present in the feed gas. Thus, $H_2S$ is the sole sulphur species which is desorbed. The level of any other sulphur species, including COS, $CS_2$, $SO_2$, in the second product gas is below 20 ppm, especially below 10 ppm, in particular, the combined levels of all such species is below 20 ppm, in particular less than 10 ppm.

The second product gas, in view of its high $H_2S$ content, is ideally suited to be subjected to further application in e.g. Claus sulphur production. Since Claus tail, appropriately after pre-drying as described further below, gases are especially suitable as feed gas for the process according to the first aspect of the invention, and the second product gas may be recycled to the feed in a Claus process, the present process is particularly suited to be incorporated with a Claus plant. These aspects of the invention are discussed further below. Another advantageous application is the desulphurization of fuel gas in e.g. refineries. The low hydrocarbon content of the second product gas effluent is particularly advantageous, as hydrocarbons are undesirable in the downstream Claus process.

If desired, a flushing (rinsing) step may be inserted between loading step (a) and desorption step (b), so as to avoid mutual contamination of product gases issuing from steps (a) and (b). Such rinsing may be performed using the same temperatures, pressures and flow rates of steps (a) and (b), and may be continued for e.g. between 1 and 15 minutes. Suitable rinsing gases include inert gases, such as nitrogen, and may also contain carbon dioxide, hydrogen or methane, while levels of $H_2O$ should preferably be low (preferably as defined for the feed gas in absolute terms, i.e. below 5%, more preferably below 2%, most preferably below 0.5%) and sulphur compounds should essentially be absent (less than 10 ppm).

After the purging step (b), the adsorbent is typically regenerated so as to allow its reuse in step (a) in the process of the invention. This regeneration includes removal (desorption) of $H_2O$ from the adsorbent, to such an extent that, depending on the water content of the feed gas, the $H_2O$ to $H_2S$ levels during adsorption step (a) are set to the to appropriate conditions as described above. Thus, according to an especially preferred embodiment, the process according to the first aspect of the invention further comprises a step (c) wherein the purged adsorbent is regenerated by drying (i.e. removal of $H_2O$). The drying of step (c) may be accomplished by any means known in the art for drying a solid adsorbent material. Suitable means include reducing the pressure in the reactor (e.g. pressure swing adsorption (PSA) or vacuum pressure swing adsorption (VPSA) mode), increasing the temperature (e.g. temperature swing adsorption (TSA) mode), contacting the purged adsorbent with dry gas (e.g. passing a gas through the reactor). The dry gas should contain less than 0.1% water, and may comprise nitrogen, noble gases, carbon dioxide, and possibly low levels carbon monoxide and hydrocarbons. Combinations of drying techniques, e.g. depressurisation and heating, may also be used.

The process of the invention is preferably performed in multiple cycles of steps (a)-(c). In other words, the process is performed in cycles of steps (a) to (c). The present process is preferably carried out in cyclic mode. Since contamination of the adsorbent does hardly occur, a large number of cycles, e.g. several thousands or even more, may be performed before any cleaning or exchange of adsorbent or other maintenance steps are needed.

The invention also pertains to the use of an $H_2S$-enriched gas as obtained in step (b) of the process of the invention as an $H_2S$ feed gas for processes in which appreciable levels, e.g. at least 10% or even at least 25% of $H_2S$ are required. Examples of such process include the production of elemental sulphur, e.g. in the Claus process or in biological partial oxidation (Thiopaq), or for the production of sulphuric acid or other sulphur compounds.

Claus Process

According to a second aspect, the invention concerns a Claus process as known in the art, wherein the process according to the first aspect of the invention is implemented. Claus processes are known in the art and used for desulphurisation of gases, wherein $H_2S$ is converted to elemental sulphur via the overall chemical reaction:

$$2H_2S + O_2 \rightarrow 2S + 2H_2O \quad (3)$$

This overall reaction may be a combination of several subreactions, which typically occur in several stages of the Claus process. A typical Claus process includes a thermal stage wherein the feed gas comprising $H_2S$ is heated to a temperature above 800° C. by reaction of a sub-stoichiometric amount of oxygen, wherein combustion of $H_2S$ via $SO_2$ to S, and a catalytic stage, wherein $H_2S$ reacts with $SO_2$ in the presence of an alumina or titania based catalyst. Side reactions that typically occur during the Claus process include the formation of $H_2S$, COS, $CS_2$ and $SO_2$. These species, together with unreacted $H_2S$ make up the Claus tail gas, which is the major by-product of elemental sulphur produced in the Claus plant. Furthermore, the Claus process can be tuned as known in the art such that $SO_2$ is typically absent in the Claus tail gas.

Typical Claus feeds include sour natural gas, or more typically the $H_2S$-enriched stream obtained by amine scrubbing thereof, and gaseous by-products of refineries or other industries. Such gaseous by-products are typically obtained by desulphurization steps, wherein $H_2S$ contaminants are removed from the main product stream, e.g. by amine scrubbers. As such gaseous steams are obtained or formed in large quantities, the Claus process is ubiquitous in present-day industry. To be suitable for conversion by Claus, the feed gas requires a minimum $H_2S$ content of 15%, but at least 25% $H_2S$ is preferred, which renders many $H_2S$ containing gaseous stream unsuitable to be directly used as Claus feed gas. The gases that are suitable as feed gas for the process according to the first aspect of the invention are typical examples of gases that have a too low $H_2S$ content to be suitable as Claus feed gas. However, the second product gas obtained by the process according to the first aspect of the invention contains $H_2S$ in a sufficiently high content to be suitable as feed gas for the Claus process. The process according to the first aspect of the invention can thus be used to enrich a gaseous stream in $H_2S$ in order to make it suitable as feed gas for a Claus process.

The process according to the second aspect of the invention concerns a process for converting $H_2S$ to elemental sulphur (S) comprising the step of subjecting the second product gas as obtained in the process according to the first aspect of the invention, optionally after pre-drying, to a Claus process to obtain elemental sulphur and a tail gas comprising $H_2S$ equivalents and $CO_2$. If needed, the second product gas is pre-dried, i.e. the $H_2O$ content is reduced, in order to render the second product gas suitable to be subjected to a Claus process. The required composition of the second product gas to be suitable as feed gas for a Claus process depends on whether or not the second product gas is combined with a further feed gas, typically an $H_2S$-enriched stream obtained by amine scrubbing of sour natural gas or an $H_2S$-containing gaseous by-product of a refinery or other industry, before or upon being subjected to the Claus process, and to the composition of said further feed gas. The skilled person knows to what extent the second product gas needs to be dried in order to be suitable to be used as feed gas for the Claus process according to the second aspect of the invention. Any means of drying as known in the art may be used as pre-drying, such as cooling and/or pressurisation resulting in condensation of water or by other conventional methods such as absorption or adsorption. Suitable drying means include condensation of steam to liquid water, while keeping $H_2S$ and other species such as $CO_2$ and inert gases gaseous. The remaining gaseous components are then fed to the Claus process. Cooling of the second product gas from a temperature of about 350° C. to about 40° C. reduces the steam content to about 7%, which is acceptable for a Claus feed gas. In a preferred embodiment, the second product gas is combined with a further feed gas, typically an $H_2S$-enriched stream obtained by amine scrubbing of sour natural gas or a $H_2S$-containing gaseous by-product of a refinery or other industry, before or upon being subjected to the Claus process.

In a preferred embodiment, the tail gas of the Claus process according to the second aspect of the invention, comprising $H_2S$ equivalents and $CO_2$, is used as feed gas in step (a) of the process according to the first aspect of the invention, optionally after pre-drying. In one embodiment, the Claus tail gas is pre-treated prior to being subjected to step (a) of the process according to the first aspect of the invention. Pre-treatment may be employed to lower the $H_2O$ content and/or the $SO_2$ content (or the $SO_x$ content). As the required $H_2O$ content of the feed gas of the process according to the first aspect of the invention is critical, and typical Claus tail gases are too wet, it is preferred that the Claus tail gas is pre-dried, before being subjected as feed gas to the process according to the first aspect of the invention. Any means of drying as known in the art may be used as pre-drying, such as cooling and/or pressurisation resulting in condensation of water or by other conventional methods such as absorption or adsorption. Suitable drying means include condensation of steam to liquid water, while keeping $H_2S$ equivalents and $CO_2$ gaseous. The remaining gaseous components are then fed to the process according to the first aspect of the invention. Since drier feed gases give rise to increased $H_2S$ adsorption capacity of the adsorbent, it is preferred that pre-treatment to lower the $H_2O$ content includes a measure to lower the $H_2O$ level to well below 1%. Such a measure may include a glycol rinse of the Claus tail gas and/or contacting the Claus tail gas with molecular sieves, optionally after one or more of the above-mentioned techniques. Alternatively or additionally, the $H_2O$ content may be lowered by selective permeation of water through a membrane (e.g. by vacuum permeation). Claus tail gases pre-treated as such are especially suitable to be used as feed gas for the process according to the first aspect of the invention, in view of their extremely low or even negligible water content. Pre-treatment to lower the $SO_2$ or $SO_x$ content is particularly preferred, since the presence of $SO_2$ is undesirable in the feed gas of the process according to the first aspect of the invention, as discussed above, and typically involves subjecting a $SO_x$-containing gas to a hydrogenation-hydrolysis step, as known to the art, to convert $SO_x$ to $H_2S$. The $H_2$ required in this respect may originate from the Claus tail gas itself or from substoichiometric combustion of fuel (e.g. natural gas) to a mixture of CO and $H_2$. $SO_x$ can also be lowered by scrubbing with an alkaline solution followed by chemical reduction, e.g. using hydrogen, or by biological reduction, e.g. using bacteria of the genera *Desulfovibrio, Desulfobacterium, Desulforomonas* or the like. Alternatively and preferably, the Claus process is tuned as known in the art such that the tail gas is substantially free of $SO_x$ (i.e. content below 100 ppm, preferably below 10 ppm). Such tuning is typically accomplished by tuning the amount of $O_2$ added to the Claus feed in the thermal stage, in order to limit the amount $SO_2$ produced so that the off-gas of the Claus plant does not contain $SO_2$, but only $H_2S$ (and optionally COS and/or $CS_2$).

System

In a third aspect, the invention concerns a system designed to implement the processes according to the first and second aspects of the invention, comprising (A) a Claus unit and (B) an adsorption module equipped with (b1) a bed of adsorbent comprising alumina and one or more alkali metals. Any type of Claus unit or even an entire Claus plant as known in the art may be employed as Claus unit (A) in the system according to the invention. Suitable Claus units typically include a thermal unit and a series of catalytic reactors with intermediate cooling units. In the thermal unit, the Claus feed is mixed with a substoichiometric amount of air (or oxygen) and subsequently burnt. Herein, any hydrocarbon present in the Claus feed is preferably combusted and part of the $H_2S$ is converted into $SO_2$, during which some elemental sulphur is produced. The reaction mixture is transferred to a series of catalytic reactors with intermediate cooling and elemental sulphur condensation stages. Typically, at least two, preferably three or even four catalytic reactors are employed. Each catalytic reactor is employed with a catalyst bed, typically an activated alumina. Herein, the conversion of 2 $H_2S$ and $SO_2$ into S and 2 $H_2O$ is catalyzed. Since this reaction is an equilibrium reaction, multiple catalytic stages are preferred in order to obtain high yields of elemental sulphur. Remaining hydrocarbons that may still be present in this step may deactivate the catalyst. A standard Claus plant contains three catalytic reactors, which enables sulphur recoveries of 95-98 wt %. Claus unit (A) comprises a first inlet (a1) for receiving a gaseous feed stream and preferably a second inlet (a2) for receiving a further gaseous feed stream. The first inlet (a1) is intended for receiving the second product gas of the process according to the first aspect of the invention, while the optional second inlet (a2) is for receiving an optional further feed gas, as discussed above. Alternatively and preferably, the system according to the invention comprises means (a3) for combining the second product gas and a further feed gas to obtained a combined feed gas prior to the introduction of the combined feed gas into the Claus unit. In this embodiment, first inlet (a1) is intended for receiving the combined gas feed comprising the second product gas of the process according to the first aspect of the invention and the further feed gas. Any means for combining as known in the art can be used as means (a3), such as "in line" or "in pipe" mixing. Typically, the Claus unit comprises a third inlet (a4) for receiving air. The Claus unit further comprises a first outlet (a5) for discharging elemental sulphur (S) and a second outlet (a6) for discharging a tail gas. The Claus unit may comprise further outlets for discharging elemental sulphur and/or tail gas.

The adsorption module (B) comprises at least one bed reactor, wherein the bed (b1) comprises, preferably consists of, the adsorbent according to the invention as bed material. The adsorbent according to the invention comprises alumina and one or more alkali metals and is further described above for the process according to the first aspect of the invention. Adsorption module (B) further comprises a first inlet (b2) for receiving the feed gas and optionally the purging gas, although it is preferred that the purging gas is received via a second inlet (b3), and a first outlet (b4) for discharging the second product gas and optionally the first product gas, although it is preferred that the first product gas is discharged via a second outlet (b5). A single bed reactor may be used, the bed (b1) of which is alternately loaded in step (a), i.e. $H_2S$ equivalents adsorb, and unloaded in step (b), i.e. $H_2S$ desorbs, or two or more reactors in parallel may be used in module (B). Preferably, adsorption module (B) comprises two or more bed reactors, which enables performing step (a) of the process according to the first aspect of the invention in a first reactor and simultaneously step (b) of the process according to the first aspect of the invention in a second reactor. As such, a continuous process is possible, wherein a feed gas may continuously be fed to adsorption module (B), alternating to the first and second reactor, and a purge gas may continuously be fed to adsorption module (B), alternating to the second and first reactor. The reactor to which the feed gas is fed discharges the first product gas, while the reactor to which the purge gas is fed discharges the second product gas. Even more preferred is the use of three bed reactors, wherein a first bed is being subjected to step (a) while a second bed is being subjected to step (b) and a third bed to step (c). In this embodiment, the two, three or more beds operate according to the cyclic scheme of step (a)→step (b)→step (c)→step (a)→etc.

The bed reactor is preferably a packed bed reactor or a fluidized bed reactor, more preferably a packed bed reactor. The reactor is typically in the form of a column, tube or vessel, wherein preferably a reactor is packed with the adsorbent material. The reactor is designed as known in the art, typically to enable the stream of the feed gas or the purge gas, which is introduced via one of the inlets (b2) or (b3), to be led over or through the bed, towards one of the outlets (b4) or (b5). In case a column is used, the inlet (b1) for receiving the feed gas is conveniently placed at the bottom or top of the column, and the outlet (b4) for discharging the product gases is conveniently placed at the other side of the column. Alternative arrangements, including horizontal flows or flow entering and leaving the column at the long sides, are also well suitable.

In the system according to the invention, the Claus unit (A) and the adsorption module (B) are interconnected, i.e. the outlet of one is in fluid connectivity with the inlet of the other, preferably by means of a conduit. As such, the constant flow of (liquid) streams through the system is enabled. Thus, the second outlet (a6) of the Claus unit (A) is in fluid connection with the inlet (b2) of the adsorption module (B), and the first outlet (b4) of the adsorption module (B) is in fluid connection with the first inlet (a1) of the Claus unit (A). Using such arrangement, the Claus tail gas is effectively recycled to the Claus unit by increasing the $H_2S$ content thereof. In view of legal requirements, Claus tail gases need to be treated to remove $H_2S$ equivalents before it may be expelled into the environment after incineration. A major advantage of the recycle according to the present invention is that conventional tail gas treatments (TGT) are no longer required, which are typically less environmentally friendly and more expensive than the process according to the first aspect of the invention. For example, amine scrubbing as TGT removes $H_2S$ together with significant quantities of $CO_2$, giving a typical ratio of $H_2S$ to $CO_2$ of below 0.1, which renders this gas less suitable to be recycled to the Claus process. The processes according to the invention are advantageous, since a high quality recycle gases for the Claus unit are obtained. For typical Claus tail-gases having a high $CO_2/H_2S$ ratio, conventional separation technologies are not capable to provide highly enriched $H_2S$ streams. Moreover, conventional TGT usually create a separate sulphur-product such as sulphuric acid. Separation by adsorption gives potentially smaller TGT units compared to conventional TGT units.

In a preferred embodiment, the Claus tail gas as discharged from the Claus unit (A) via outlet (a6) is first led to a steam removal unit (C1) before being received by adsorption module (B) via inlet (b2). Steam removal unit (C1) is thus integrated in the fluid connectivity between outlet (a6) and inlet (b2). Unit (C1) comprises means for removing steam from the Claus tail gas. Any type of such means as known in the art may be used, such as means for cooling and/or pressurisation resulting in condensation of water or other conventional means such as absorption or adsorption means. More preferably, the steam removal means includes a measure to lower the $H_2O$ level to well below 1%. Such a measure may include a glycol rinse of Claus tail feed gas and/or contacting the Claus tail gas with molecular sieves, optionally after one or more of the above-mentioned techniques. Alternatively or additionally, the $H_2O$ content may be lowered by selective permeation of water through a membrane (e.g. by vacuum permeation). Unit (C1) is designed for receiving the Claus tail gas originating from outlet (a6) of Claus unit (A) to the means for steam removal and for discharging the Claus tail gas which is depleted in steam from the means for steam removal. The Claus tail gas depleted in steam is then led to inlet (b2) of adsorption module (B). It is likewise preferred that a similar steam removal unit (C2) is integrated in the fluid connectivity between outlet (b4) and inlet (a1) or, if present, means (a3). Unit (C2) comprises means for removing steam from the second product gas. Any type of such means as known in the art may be used, such as means for cooling and/or pressurisation resulting in condensation of water or other conventional means such as absorption or adsorption means. Unit (C2) is designed for receiving the second product gas originating from outlet (b4) of adsorption module (B) to the means for steam removal and for discharging the second product gas which is depleted in steam from the means for steam removal. The second product gas depleted in steam is then led to inlet (a1) or means (a3) of the Claus unit (A). In the context of the present invention, units (C1) and (C2) are used for pre-drying as described for the processes according to the first and second aspects of the invention.

In a further preferred embodiment, a $SO_x$ removal unit is integrated in the fluid connectivity between outlet (b4) and inlet (a1), preferably downstream of the unit C2 if present. The presence of such a $SO_x$ removal unit is particularly preferred for Claus tail gases containing $SO_x$. The $SO_x$ removal unit comprises means for removing $SO_x$ from the Claus tail. Suitable means for removing $SO_x$ include hydrogenation-hydrolysis means, which is known to the art to covert $SO_x$ to $H_2S$, means for scrubbing with an alkaline solution followed by chemical reduction, e.g. using hydrogen, or means for biological reduction, e.g. using bacteria of the genera *Desulfovibrio, Desulfobacterium, Desulforomonas* or the like. The $SO_x$ removal unit is designed for receiving the Claus tail gas originating from outlet (a6) of Claus unit (A), optionally via unit (C1), to the means for $SO_x$ removal and for discharging the Claus tail gas which is depleted in $SO_x$ from the means for steam removal. The Claus tail gas depleted in $SO_x$ is then led to inlet (b2) of adsorption module (B), optionally via unit (C1).

BRIEF DESCRIPTION OF THE FIGURES

A preferred embodiment of the system according to the invention is depicted in FIG. 1. Claus unit (A) may be any Claus unit or Claus plant as known in the art. It comprises a first inlet (a1) for receiving a combined feed gas originating from means (a3) for combining the second product gas and a further feed gas. Unit (A) further comprises a first outlet (a5) for discharging elemental sulphur and a second outlet (a6) for discharging a Claus tail gas. Second outlet (a6) is in fluid connectivity via steam removal unit (C1) with inlet (b2) of the adsorption module (B). Adsorption module (B) comprises a bed (b1) containing the adsorbent according to the invention as bed material, a first inlet (b2) for receiving the Claus tail originating from unit (C1) and a second inlet (b3) for receiving a purge gas. Module (B) further comprises a first outlet (b4) for discharging the second product gas and a second outlet (b5) for discharging the first product gas. Module (B) is designed as such that incoming gases from inlets (b2) and (b3) are led through or over the bed towards outlets (b4) and (b5). First outlet (b4) is in fluid connectivity via steam removal unit (C2) with means (a3). Means (a3) is designed to combine the second product gas originating from unit (C2) and a further feed gas.

EXAMPLES

Example 1

A feed gas containing 10% $CO_2$, 10% $H_2$ and 500 ppm $H_2S$ (balanced with $N_2$) was subjected to adsorption in a packed bed placed in a cylindrical reactor containing 1 g adsorbent. The feed flow was 150 Nml/min, and the bed operated at a temperature of 400° C. and a pressure of 3 bar(a). The process according to the invention was operated in a cyclic co-current mode. Cycles consisted of an adsorption stage, a flushing stage, a purging stage and a regeneration stage. The adsorption stage was continued until full breakthrough of $CO_2$ and $H_2S$ was reached. Subsequently, the loaded adsorbent was flushed with 10% Ar in $N_2$ (flow=150 Nml/min) and then purged with a purging gas containing 30% $H_2O$ (balanced with Ar and $N_2$; flow=150 Nml/min). As last step in the cycle, the adsorbent loaded with $H_2O$ was regenerated by flushing with a dry inert gas (10% Ar in $N_2$; flow=150 Nml/min). The adsorbents used were K-promoted hydrotalcite MG30 (KMG30), K-promoted alumina (20 wt % $K_2CO_2$ on alumina) and unpromoted MG30 (control). A similar experiment was conducted with 0.5 g Na-promoted MG30 as adsorbent, which operated at 350° C. and 1 bar(a) and wherein the gas flows (feed, purge and flushes) were 100 Nml/min.

Figure 1:
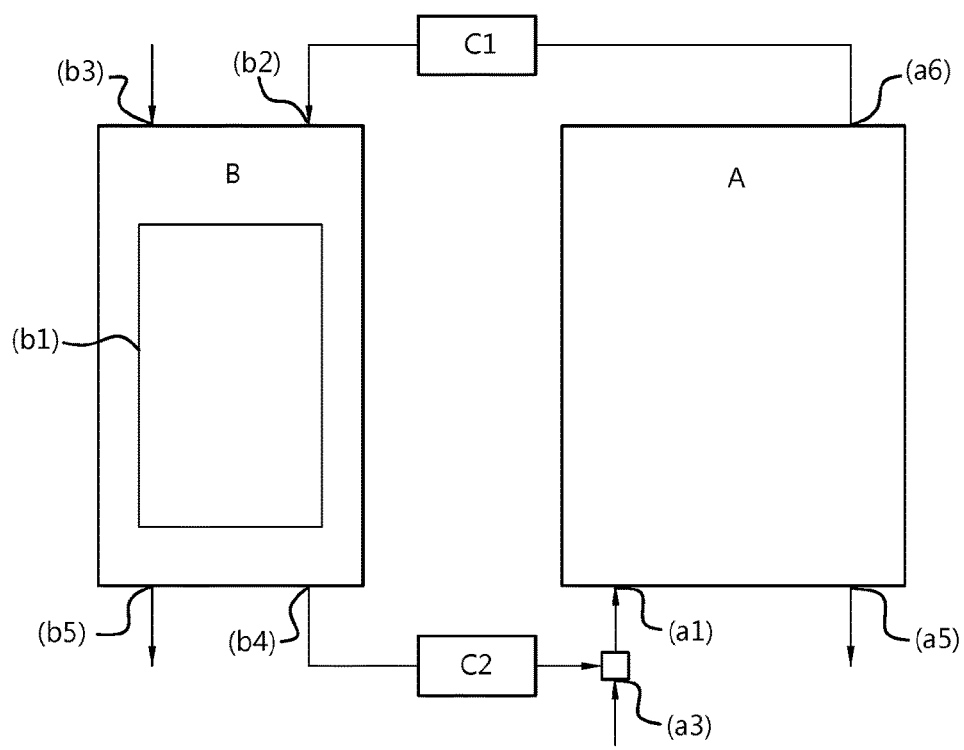
Figure 2:
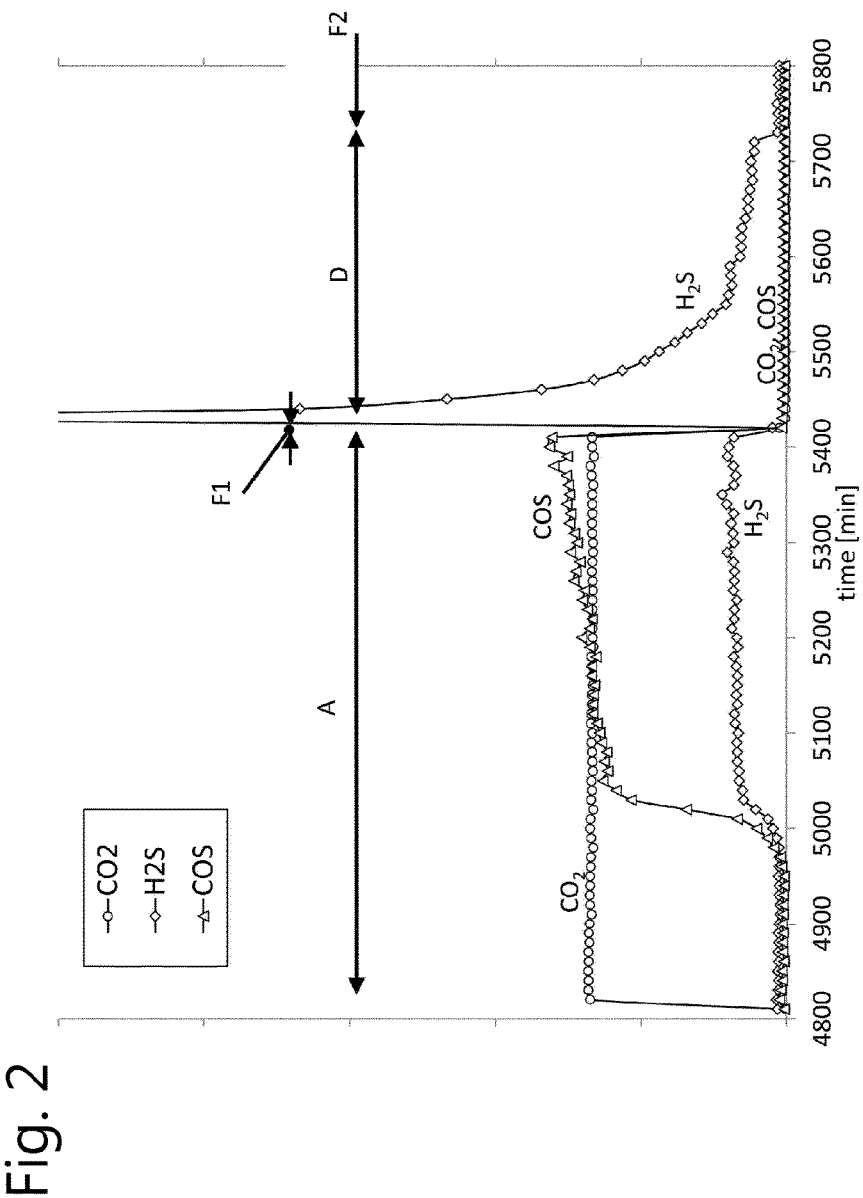
FIGS. 2-8 depict compositions of the tail gases obtained in examples 1-3.
Figure 3:
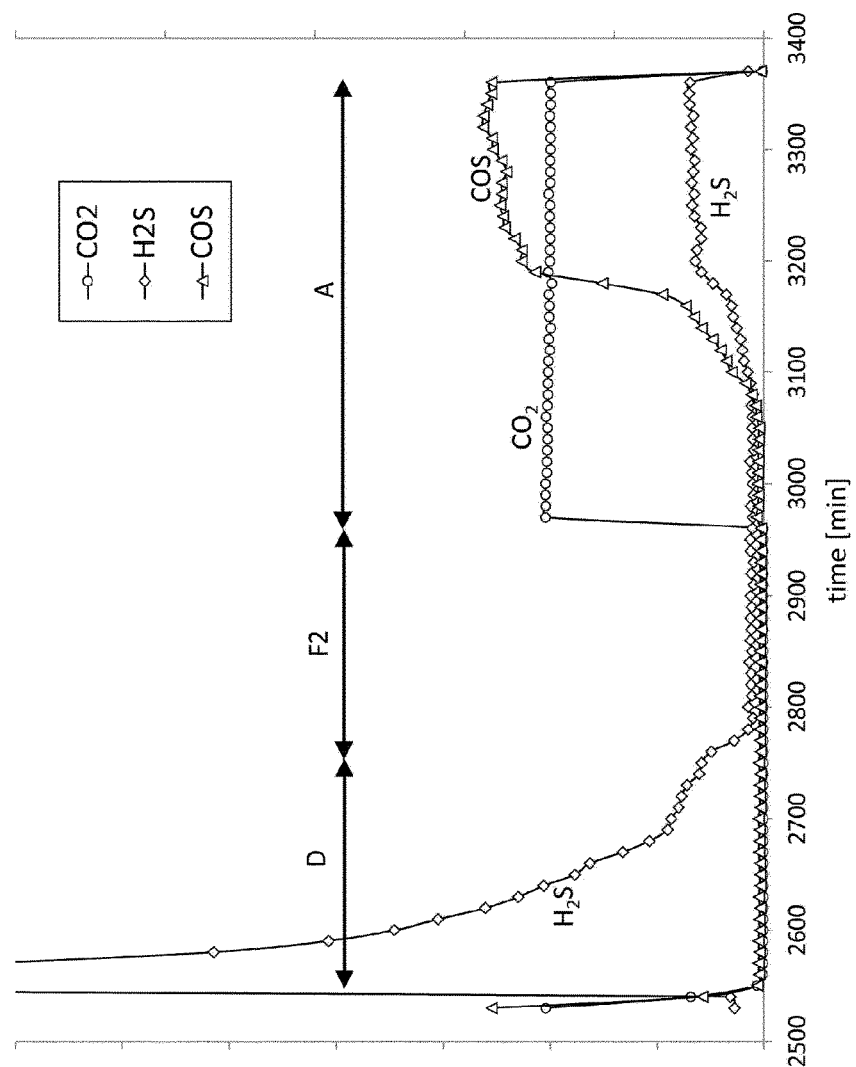
Figure 4:
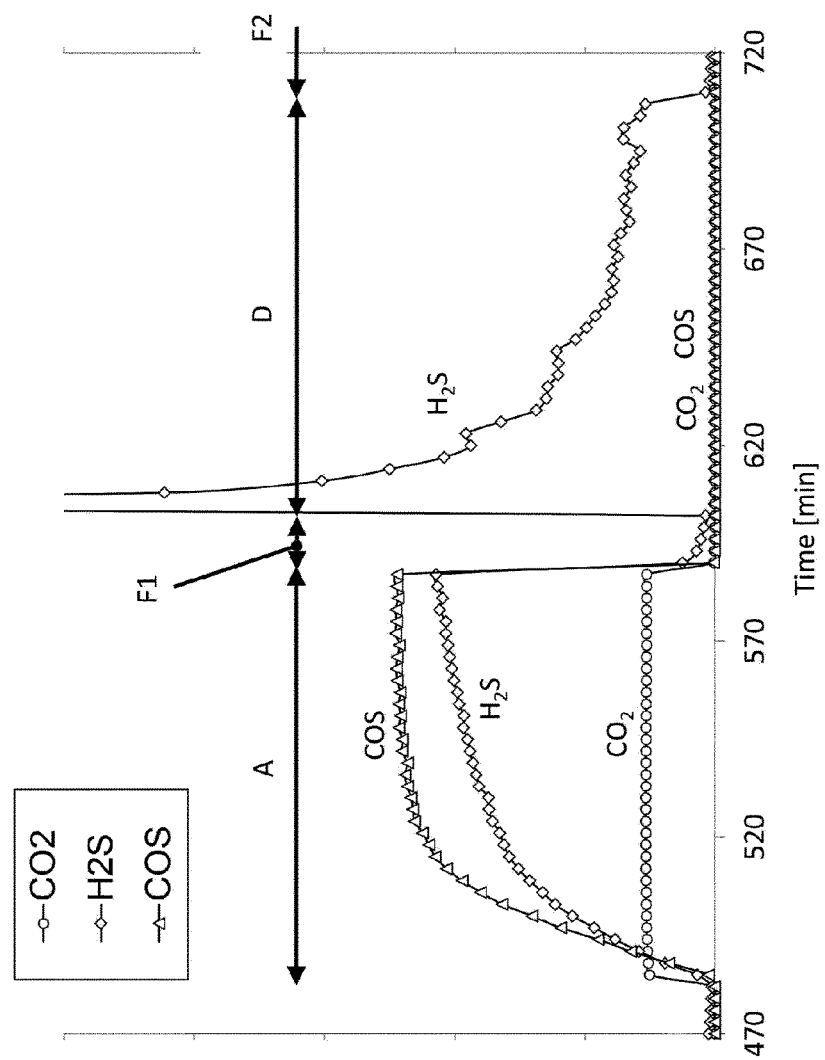
Figure 5:
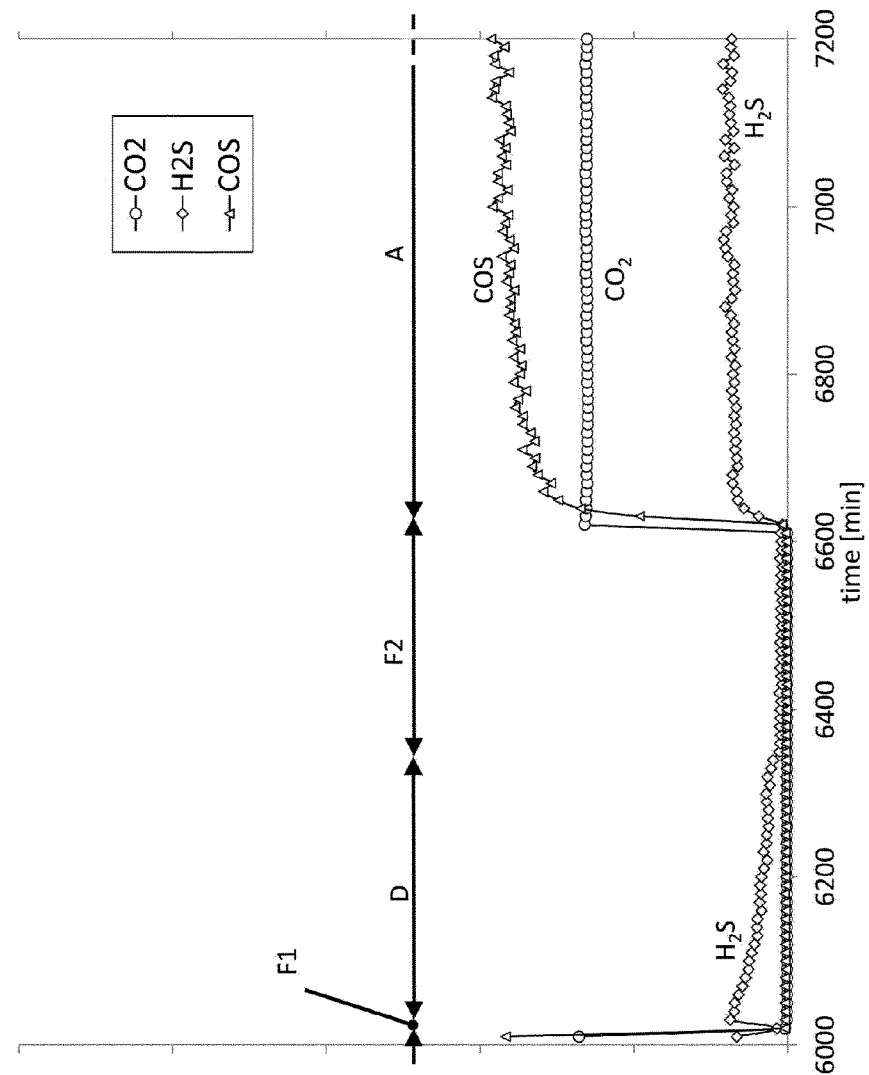

FIGS. 2-5 depict the tail gas (effluent) composition of a cycle of each of the four experiments: FIG. 2 shows the results for KMG30 as adsorbent, FIG. 3 for K-promoted alumina, FIG. 4 for Na-promoted MG30 and FIG. 5 for unpromoted MG30. Ar levels were also determined (data not shown), to visualise the switches between the different stages. These stages are indicated with A, D, F1 and F2, wherein "A" denotes the adsorption stage (feed gas), "D" the desorption or purging stage (purging gas), and "F1" and "F2" the first inert flush and second inert flush (regeneration), respectively. On the y-axis, the mass spectrometer (MS) response in arbitrary units is shown.

In all experiments, fast breakthrough of $CO_2$ was observed after the adsorption period commenced. Because of the high sorbent capacity for $H_2S$ equivalents, breakthrough of $H_2S$ (and COS) was observed at a later time, indicating saturation of the adsorbent with $H_2S$ and COS at that time. For the control unpromoted adsorbent, breakthrough times for $CO_2$, $H_2S$ and COS were similar (FIG. 5), indicating that significantly less $H_2S$ (and COS) is adsorbed during the adsorption phase. For the experimental adsorbents, the $H_2S$+COS slip level before breakthrough as observed in the first effluent (tail gas of the adsorption phase) was less than 5 ppm, i.e. >2 orders of magnitude decrease with respect to the feed gas. It should be noted that no COS was present in the feed gas, meaning that the adsorbent promotes the $H_2S+CO_2 \leftrightarrow COS+H_2O$ equilibrium reaction at the operating conditions. In view of the simultaneous breakthrough of $H_2S$ and COS, those species are both adsorbed. Upon steam regeneration, $CO_2$ was released swiftly from the adsorbent, while desorption of $H_2S$ is spread over a longer period of time. The second effluent (tail gas of the desorption phase) contained $H_2S$, $CO_2$, $H_2O$ and inert gases. No desorption of COS was observed, indicating that all adsorbed sulphur species are released as $H_2S$. For the control unpromoted adsorbent, hardly any $H_2S$ desorption was observed (FIG. 5), reflecting the small amount of $H_2S$ adsorbed in the adsorption period.

Example 2

Two distinct feed gases containing 10% $CO_2$, 10% $H_2$ and 500 ppm or 900 ppm $H_2S$ (balanced with $N_2$) were subjected to adsorption in a packed bed placed in a cylindrical reactor containing 0.5 g K-promoted hydrotalcite MG30 (KMG30) as adsorbent. The feed flow was 200 Nml/min, and the bed operated at a temperature of 350° C. and a pressure of 1 bar(a). The process according to the invention was operated in a cyclic co-current mode. Cycles consisted of an adsorption stage, a flushing stage, a purging stage and a regeneration stage. The adsorption stage was continued until full breakthrough of $CO_2$ and $H_2S$ was reached. Subsequently, the loaded adsorbent was flushed with 10% Ar in $N_2$ (flow=200 Nml/min) and then purged with a purging gas containing 30% $H_2O$ (balanced with Ar and $N_2$; flow=200 Nml/min). As last step in the cycle, the adsorbent loaded with $H_2O$ was regenerated by flushing with a dry inert gas (10% Ar in $N_2$; flow=200 Nml/min).

Figure 6A:
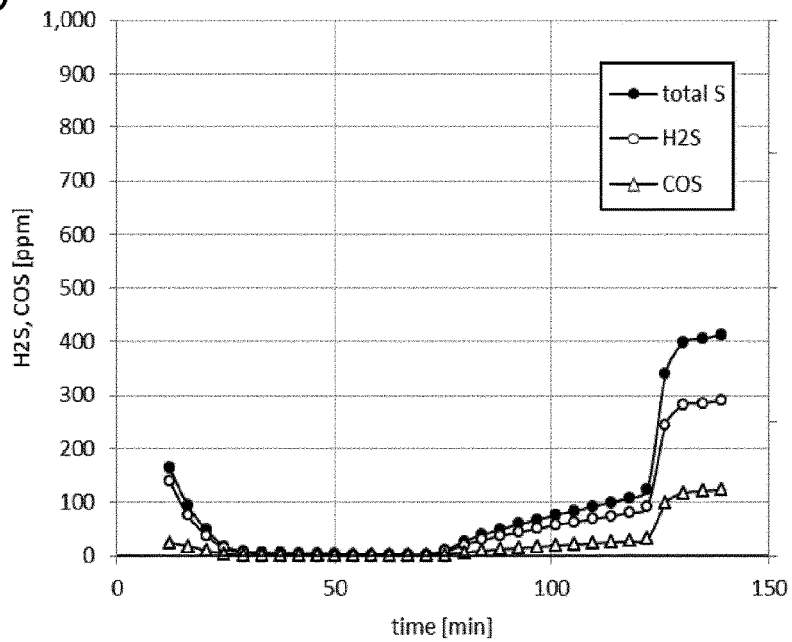
Figure 6B:
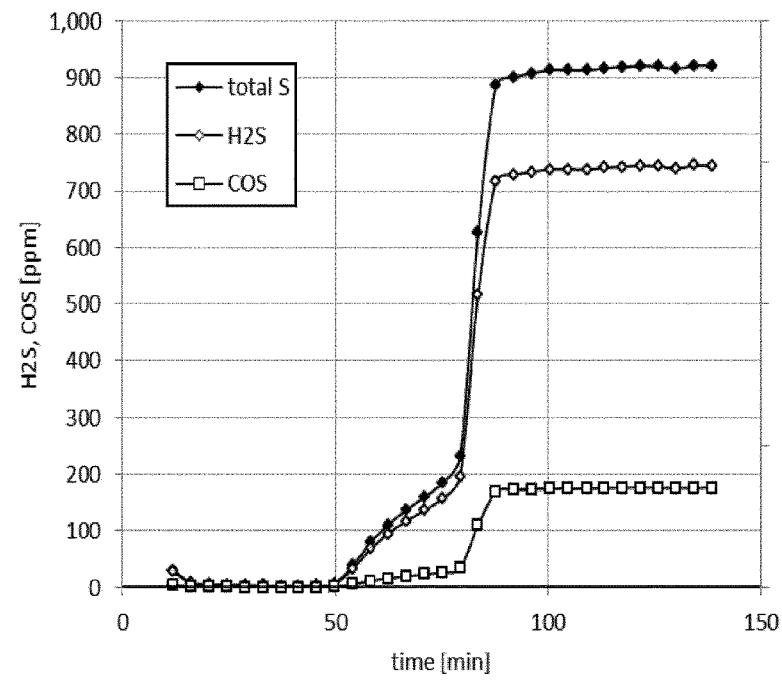

FIGS. 6a and 6b depict the tail gas compositions with respect to $H_2S$ and COS for the adsorption stage of a cycle of each of the two experiments: FIG. 6a shows the results for the feed gas comprising 500 ppm $H_2S$ and FIG. 6b for the feed gas comprising 900 ppm $H_2S$. Levels (in ppm) of $H_2S$, COS and "total S" (i.e. $H_2S$+COS) are depicted. The start of breakthrough is observed at about 75 min in FIG. 6a and at about 50 min in FIG. 6b. Before start of breakthrough, the level of total S in the tail gas (slip level) was below 5 ppm. Both $H_2S$ and COS were observed at breakthrough, while only $H_2S$ was fed. At about t=130 min (FIG. 6a) or t=80 min (FIG. 6b), the adsorbent reached full capacity for the $H_2S$ equivalents, and full breakthrough was reached.

Figure 7:
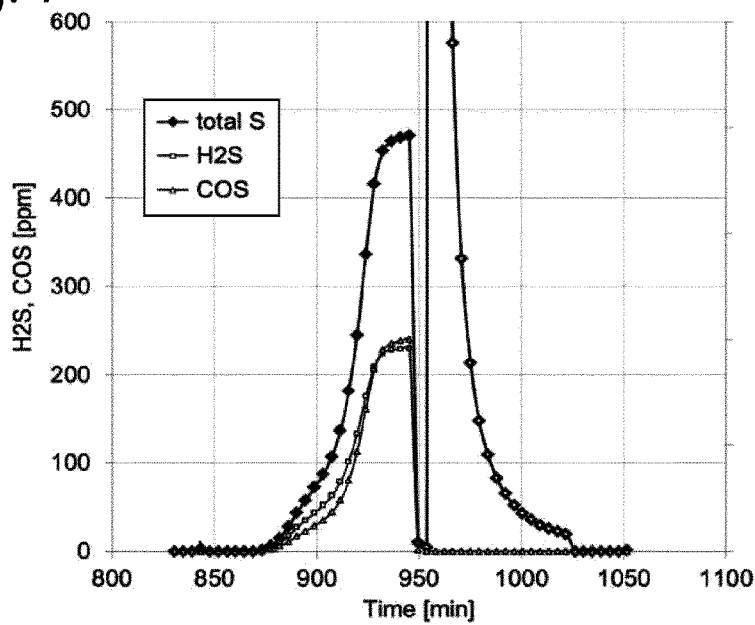

FIG. 7 depicts a more detailed analysis of the tail gas composition obtained with the feed gas comprising 500 ppm $H_2S$. Levels (in ppm) of $H_2S$, COS and "total S" (i.e. $H_2S$+COS) are depicted. The results of a different cycle as the one presented in FIG. 6a are presented. In the cycle of FIG. 7, the slip level of total S was below 1 ppm (t=840-875 min). At full breakthrough, about 500 ppm of sulphur species ($H_2S$ to COS ratio of about 1) was observed in the tail gas, at which point the loaded adsorbent was briefly flushed (around t=950) and the purging stage commenced. During purging, a peak in the $H_2S$ level of the tail gas was observed, with initial $H_2S$ levels well above 600 ppm, while COS was absent in the tail gas from the start of the purging phase. The second product gas obtained during the purging phase thus contained high levels of $H_2S$ as sole $H_2S$ equivalent.

Example 3

A feed gas containing 10% $CO_2$, 10% $H_2$ and 100 ppm $CS_2$ (balanced with $N_2$) was subjected to adsorption in a packed bed placed in a cylindrical reactor containing 0.5 g K-promoted hydrotalcite MG30 (KMG30) as adsorbent. The feed flow was 200 Nml/min, and the bed operated at a temperature of 350° C. and a pressure of 1 bar(a). The process according to the invention was operated in a cyclic co-current mode. Cycles consisted of an adsorption stage, a flushing stage, a purging stage and a regeneration stage. The adsorption stage was continued until full breakthrough of $CO_2$ and $H_2S$ was reached. Subsequently, the loaded adsorbent was flushed with 10% Ar in $N_2$ (flow=200 Nml/min)

and then purged with a purging gas containing 30% $H_2O$ (balanced with Ar and $N_2$; flow=200 Nml/min). As last step in the cycle, the adsorbent loaded with $H_2O$ was regenerated by flushing with a dry inert gas (10% Ar in $N_2$; flow=200 Nml/min).

Figure 8:
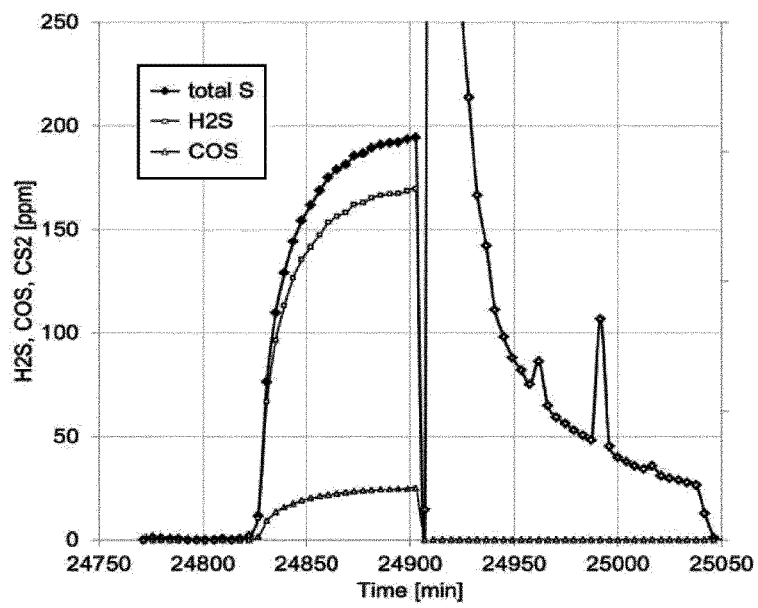

FIG. 8 depicts the tail gas composition with respect to $H_2S$ equivalents for a cycle of the experiment. Levels (in ppm) of $H_2S$, COS and "total S" (i.e. $H_2S+COS+CS_2$) are depicted. In the cycle of FIG. 8, the slip level of total S was below 1 ppm (t=24770-24830 min). At full breakthrough, about 200 ppm of sulphur species ($H_2S$ to COS ratio of about 7) was observed in the tail gas, while no $CS_2$ was completely absent in the tail gas ($H_2S+COS$=total S). The loaded adsorbent was briefly flushed (around t=24910) and the purging stage commenced. During purging, a peak in the $H_2S$ level of the tail gas was observed, with initial $H_2S$ levels well above 250 ppm, while both COS and $CS_2$ were completely absent in the tail gas from the start of the purging phase. The second product gas obtained during the purging phase thus contained high levels of $H_2S$ as sole $H_2S$ equivalent, while $CS_2$ was present as sole $H_2S$ equivalent in the feed gas.

Example 4

Seven distinct feed gases containing 10% $CO_2$, 10% $H_2$, and varying amounts of $H_2S$ and $H_2O$ (see Table 2, balanced with $N_2$) were subjected to adsorption in a packed bed placed in a cylindrical reactor containing 0.5 g K-promoted hydrotalcite MG30 (KMG30) as adsorbent. The feed flow was 200 Nml/min, and the bed operated at a temperature of 350° C. and a pressure of 1 bar(a). The process according to the invention was operated in a cyclic co-current mode. Cycles consisted of an adsorption stage, a flushing stage, a purging stage and a regeneration stage. The adsorption stage was continued until full breakthrough of $CO_2$ and $H_2S$ was reached. Subsequently, the loaded adsorbent was flushed with 10% Ar in $N_2$ (flow=200 Nml/min) and then purged with a purging gas containing 30% $H_2O$ (balanced with Ar and $N_2$; flow=200 Nml/min). As last step in the cycle, the adsorbent loaded with $H_2O$ was regenerated by flushing with a dry inert gas (10% Ar in $N_2$; flow=200 Nml/min). During cyclic steady state, both the breakthrough adsorption capacity at and the total adsorption capacity of the adsorbent for $H_2S$ equivalents was determined, the results of which are presented in table 2. Breakthrough adsorption capacity refers to the capacity of the adsorbent during the adsorption phase until start of breakthrough, wherein start of breakthrough is defined as the point in time when the total slip level of sulphur species ($H_2S+COS$) in the tail gas reaches a level of 10 ppm. Total adsorption capacity refers to the capacity of the adsorbent during the adsorption phase until total breakthrough is reached, i.e. when the content of sulphur species ($H_2S+COS$) in the tail gas is equal to the content of sulphur species in the feed gas.

TABLE 2

Feed gas compositions and adsorption capacities for $H_2S$

| | Feed gas composition (ppm) | | | Adsorption capacity (mol/kg) | |
|---|---|---|---|---|---|
| Entry | $H_2S$ | $H_2O$ | $H_2O/H_2S$ | breakthrough | total |
| 1 | 500 | 0 | 0 | 0.57 | 0.841 |
| 2 | 500 | 575 | 1.15 | 0.40 | 0.727 |
| 3 | 500 | 900 | 1.80 | 0.31 | 0.617 |
| 4 | 900 | 0 | 0 | 0.62 | 1.124 |
| 5 | 900 | 750 | 0.83 | 0.50 | 1.053 |
| 6 | 900 | 2100 | 2.33 | 0.33 | 0.816 |
| 7 | 25000 | 117000 | 4.68 | n.d. | 0.14 |

For both the feed gases comprising 500 ppm $H_2S$ and the feed gases comprising 900 ppm $H_2S$, the adsorption capacity of the adsorbent decreased with increasing $H_2O$ content of the feed gas. The adsorption capacity for $H_2S$ decreased by about a factor 2 when the $H_2O/H_2S$ ratio increased to above 2. Extrapolating the results in Table 2, the adsorption capacity for $H_2S$ decreased to unacceptable levels in case the $H_2O/H_2S$ ratio increases to above 5, while the best results are obtained with a $H_2O/H_2S$ ratio of at most 2. It should be noted that since only $H_2S$ was used as $H_2S$ equivalent, X amounts to zero for the feed gases tested here.

The invention claimed is:
1. A process for altering the composition of a gas comprising $H_2S$ equivalents and CO2, comprising the steps of:
   (a) contacting a feed gas containing $H_2S$ equivalents, $CO_2$ and optionally $H_2O$, wherein the molar ratio of $H_2O$ to $H_2S$ equivalents is within the range of 0-(5+X), with a solid adsorbent at a temperature of 250-500° C., to obtain a loaded adsorbent and a first product gas;
   (b) contacting the loaded adsorbent with a purge gas containing $H_2O$, to obtain a second product gas; and
   (c) regenerating the adsorbent after step (b) by removal of $H_2O$,
   wherein the process is performed in cycles of steps (a) to (c), and wherein the feed gas and/or the purge gas contains a reducing agent and the adsorbent comprises alumina and one or more alkali metals, and wherein X is defined as:

$$X = \sum \frac{n_i \times [H_2S \text{ equivalent}]_i}{[H_2S \text{ equivalents}]}$$

wherein [$H_2S$ equivalents] indicates the total concentration of $H_2S$ equivalents, [$H_2S$ equivalent]$_i$ indicates the concentration of a particular $H_2S$ equivalent i and $n_i$ indicates the amount of water molecules n consumed when said $H_2S$ equivalent i is converted to $H_2S$.

2. The process according to claim 1, wherein the $H_2S$ equivalents comprise $H_2S$, COS and/or $CS_2$.

3. The process according to claim 1, wherein the molar ratio of $H_2S$ equivalents to $CO_2$ in the feed gas is below 1.

4. The process according to claim 1, wherein the molar ratio of $H_2S$ equivalents to $CO_2$ in the feed gas is in the range of 0.001-0.1.

5. The process according to claim 1, wherein the feed gas contains 0.1-20% $H_2$ as the reducing agent.

6. The process according to claim 1, wherein the adsorbent further comprises one or more divalent metals.

7. The process according to claim 1, wherein the divalent metals are oxides, hydroxides, carbonates, sulphides and/or hydrosulphides.

8. The process according to claim 1, wherein the adsorbent further comprises MgO.

9. The process according to claim 5, wherein the alkali metal is K and the adsorbent is K-promoted alumina, or is based on a K-promoted hydrotalcite.

10. The process according to claim 1, wherein the process is continued with step (a) after the regeneration of step (c).

11. The process according to claim 1, wherein step (b) is performed counter-currently with respect to step (a).

12. The process according to claim 1, wherein the purge gas comprises at least 75% $H_2O$.

13. The process according to claim 1, wherein the first product gas contains less than 10 ppm of $H_2S$ equivalents, and/or the first product gas contains less than 0.1 times the level of $H_2S$ equivalents of the feed gas, and/or the first product gas has a molar ratio of $H_2S$ equivalents to $CO_2$ of less than 0.005.

14. The process according to claim 1, wherein the second product gas has a molar ratio of $H_2S$ equivalents to $CO_2$ of at least 0.5.

15. The process according to claim 1, wherein the feed gas is an optionally pre-dried syngas further containing $H_2$ and CO.

16. The process according to claim 1, wherein the feed gas is an optionally pre-treated Claus tail gas further containing $N_2$.

17. The process according to claim 1, wherein the second product gas is subjected, optionally after pre-drying, to a Claus process to obtain elemental sulphur and a tail gas comprising $H_2S$ equivalents and $CO_2$, and the tail gas is used as feed gas in step (a), optionally after pre-drying.

18. A method for the production of elemental sulphur comprising subjecting a $H_2S$-enriched gas to a Claus process, wherein the $H_2S$-enriched gas is obtained in step (b) of a process for altering the composition of a gas comprising $H_2S$ equivalents and $CO_2$, comprising the steps of:

(a) contacting a feed gas containing $H_2S$ equivalents, $CO_2$ and optionally $H_2O$, wherein the molar ratio of $H_2O$ to $H_2S$ equivalents is within the range of 0-(5+X), with a solid adsorbent at a temperature of 250-500° C., to obtain a loaded adsorbent and a first product gas;
(b) contacting the loaded adsorbent with a purge gas containing $H_2O$, to obtain a second product gas; and
(c) regenerating the adsorbent after step (b) by removal of $H_2O$,
wherein the process is performed in cycles of steps (a) to (c), and wherein the feed gas and/or the purge gas contains a reducing agent and the adsorbent comprises alumina and one or more alkali metals, and wherein X is defined as:

$$X = \sum \frac{n_i \times [H_2S \text{ equivalent}]_i}{[H_2S \text{ equivalents}]}$$

wherein [$H_2S$ equivalents] indicates the total concentration of $H_2S$ equivalents, [$H_2S$ equivalent]$_i$ indicates the concentration of a particular $H_2S$ equivalent i and $n_i$ indicates the amount of water molecules n consumed when said $H_2S$ equivalent i is converted to $H_2S$.

19. The process according to claim 3, wherein the molar ratio of $H_2S$ equivalents to $CO_2$ in the feed gas is in the range of 0.001-0.1.

20. The process according to claim 6, wherein the divalent metals are in the form of oxides, hydroxides, carbonates, sulphides and/or hydrosulphides.

21. The process according to claim 20, wherein the adsorbent further comprises MgO.

* * * * *